US011542004B2

(12) United States Patent
Velazquez

(10) Patent No.: US 11,542,004 B2
(45) Date of Patent: Jan. 3, 2023

(54) MANEUVERABILITY INVOLVING A FIXED-WING AIRCRAFT AND AN AERIAL VEHICLE HAVING VERTICAL TAKEOFF AND LANDING CAPABILITIES

(71) Applicant: Textron Systems Corporation, Hunt Valley, MD (US)

(72) Inventor: Matthew T. Velazquez, Owings Mills, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 518 days.

(21) Appl. No.: 16/599,454

(22) Filed: Oct. 11, 2019

(65) Prior Publication Data
US 2021/0107652 A1   Apr. 15, 2021

(51) Int. Cl.
*B64D 5/00* (2006.01)
*B64C 29/00* (2006.01)
*B64C 39/02* (2006.01)
*B64D 1/10* (2006.01)
(Continued)

(52) U.S. Cl.
CPC ............ *B64D 5/00* (2013.01); *B64C 29/0033* (2013.01); *B64C 39/024* (2013.01); *B64D 1/10* (2013.01);
(Continued)

(58) Field of Classification Search
CPC ....... G01S 17/933; G01S 13/933; B64D 5/00; B64D 47/08; B64C 29/0033;
(Continued)

(56) References Cited

U.S. PATENT DOCUMENTS 2,843,337 A * 7/1958 James ................... F16C 11/069
                                                            244/2
4,267,987 A * 5/1981 McDonnell ............ B64D 39/00
                                                            244/6
(Continued)

FOREIGN PATENT DOCUMENTS

CN        106882386         6/2017
CN        106882386 A  *    6/2017    ............. B64C 27/08
(Continued)

OTHER PUBLICATIONS

International Search Report for International Application No. PCT/US2020/0053515 mailed from the International Searching Authority dated Jan. 15, 2021, 29 pages.

*Primary Examiner* — Tye William Abell
(74) *Attorney, Agent, or Firm* — BainwoodHuang

(57) ABSTRACT

Techniques involve releasing and/or capturing a fixed-wing aircraft using an aerial vehicle with VTOL capabilities while the fixed-wing aircraft is in flight. For example, the VTOL aerial vehicle may take off vertically while carrying the fixed-wing aircraft and then fly horizontally before releasing the fixed-wing aircraft. Upon release, the fixed-wing aircraft flies independently to perform a mission (e.g., surveillance, payload delivery, combinations thereof, etc.). After the fixed-wing aircraft has completed its mission, the VTOL aerial vehicle may capture the fixed-wing aircraft while both are in flight, and then land together vertically. Such operation enables the fixed-wing aircraft to vertically take off and/or land while avoiding certain drawbacks associated with a conventional VTOL kit such as being burdened by weight and drag from the VTOL kit's rotors/propellers, mounting hardware, etc. during a mission which otherwise would limit the fixed-wing aircraft's maximum airspeed, ceiling, payload capacity, endurance, and so on.

21 Claims, 14 Drawing Sheets

(51) Int. Cl.
  *B64D 9/00* (2006.01)
  *B64D 47/08* (2006.01)
  *G01S 13/933* (2020.01)
  *G01S 17/933* (2020.01)
  *G01S 19/15* (2010.01)

(52) U.S. Cl.
  CPC ............... *B64D 9/00* (2013.01); *B64D 47/08* (2013.01); *B64C 2201/021* (2013.01); *B64C 2201/027* (2013.01); *B64C 2201/082* (2013.01); *B64C 2201/108* (2013.01); *B64C 2201/127* (2013.01); *B64C 2201/16* (2013.01); *B64C 2201/182* (2013.01); *G01S 13/933* (2020.01); *G01S 17/933* (2013.01); *G01S 19/15* (2013.01)

(58) Field of Classification Search
  CPC ........ B64C 2201/021; B64C 2201/027; B64C 2201/082; B64C 2201/127; B64C 2201/108; B64C 2201/16; B64C 2201/182
  See application file for complete search history.

(56) References Cited

U.S. PATENT DOCUMENTS

| | | | | |
|---|---|---|---|---|
| 4,678,141 A | * | 7/1987 | Sarrantonio | ............ B64C 37/02 244/63 |
| 5,000,398 A | * | 3/1991 | Rashev | ................... B64C 27/08 244/116 |
| 10,173,777 B1 | * | 1/2019 | Carmack | ................... B64D 5/00 |
| 2004/0089767 A1 | * | 5/2004 | Harrison | ............... B64C 39/024 244/137.4 |
| 2007/0187547 A1 | * | 8/2007 | Kelly | ....................... B64B 1/20 244/7 R |
| 2013/0200206 A1 | * | 8/2013 | Hsieh | ..................... B64D 25/00 244/2 |
| 2014/0117147 A1 | * | 5/2014 | Hanna | ................... B64C 39/024 244/2 |
| 2015/0115096 A1 | * | 4/2015 | Rossi | ..................... B64C 37/02 244/2 |
| 2016/0327945 A1 | * | 11/2016 | Davidson | ............. B64C 39/024 |
| 2017/0036762 A1 | * | 2/2017 | Gamble | .................. B64C 27/08 |
| 2017/0158318 A1 | * | 6/2017 | von Flotow | ............. B64F 1/04 |
| 2017/0274997 A1 | * | 9/2017 | von Flotow | .......... B64C 39/024 |
| 2017/0297445 A1 | * | 10/2017 | Zheng | ...................... B64D 5/00 |
| 2017/0349283 A1 | | 12/2017 | Paunicka et al. | |
| 2019/0329886 A1 | * | 10/2019 | Pinto | ....................... B64C 27/20 |
| 2022/0033074 A1 | * | 2/2022 | McNish | ................. B64C 39/024 |
| 2022/0036748 A1 | * | 2/2022 | Fuselli | ................. G08G 5/0021 |

FOREIGN PATENT DOCUMENTS

| | | |
|---|---|---|
| EP | 3090946 | 11/2016 |
| WO | 20180107278 | 6/2018 |

* cited by examiner

MANEUVERABILITY INVOLVING A FIXED-WING AIRCRAFT AND AN AERIAL VEHICLE HAVING VERTICAL TAKEOFF AND LANDING CAPABILITIES

BACKGROUND

A conventional fixed-wing unmanned aerial vehicle (UAV) includes a fixed-wing airframe that generates lift as the UAV flies horizontally. For takeoff, the conventional fixed-wing UAV may launch from a ground-based UAV launch ramp. For landing, the conventional fixed-wing UAV may use wheels or alternatively fly into a net.

The above-described conventional fixed-wing UAV may be augmented with a vertical takeoff and landing (VTOL) kit which includes multiple rotors/propellers that affix to the airframe of the UAV. The rotors/propellers operate during takeoff and landing to enable the fixed-wing UAV to take off and land vertically.

SUMMARY

Unfortunately, there are deficiencies to the above-described conventional fixed-wing UAV which is augmented with the VTOL kit. Along these lines, once the conventional fixed-wing UAV has taken off, the components of the VTOL kit (e.g., rotors/propellers, mounting hardware, etc.) hinder the conventional fixed-wing UAV during horizontal flight. For example, the rotors/propellers add weight and drag thus limiting the fixed-wing UAV's maximum airspeed, ceiling, payload capacity, endurance, and so on.

In contrast to the above-described conventional fixed-wing UAV which is augmented with the VTOL kit, improved techniques are directed to releasing and/or capturing a fixed-wing aircraft using an aerial vehicle with VTOL capabilities (which may hereinafter be referred to as the VTOL aerial vehicle) while both aircraft are in flight. For example, the VTOL aerial vehicle may take off vertically while carrying the fixed-wing aircraft and then fly horizontally before releasing the fixed-wing aircraft. Upon release, the fixed-wing aircraft flies independently to perform one or more missions (e.g., surveillance, payload delivery, experiments/research, combinations thereof, etc.). After the fixed-wing aircraft has completed its mission(s), the VTOL aerial vehicle may capture the fixed-wing aircraft while both are in flight, and then land together vertically. Such operation enables the fixed-wing aircraft to vertically take off and/or land while avoiding certain drawbacks associated with a conventional VTOL kit such as burdening the fixed-wing aircraft with the additional weight and drag of the VTOL kit during a mission which otherwise would limit the fixed-wing aircraft's maximum airspeed, ceiling, payload capacity, endurance, and so on.

One embodiment is directed to a method of operating an aerial vehicle (e.g., a VTOL UAV) which includes capturing a fixed-wing aircraft while the aerial vehicle and the fixed-wing aircraft are concurrently in horizontal flight. The method further includes, while the fixed-wing aircraft remains captured by the aerial vehicle, transitioning from horizontal flight to hovering flight and, after transitioning from horizontal flight to hovering flight, performing a vertical landing maneuver to land the aerial vehicle while the fixed-wing aircraft remains captured by the aerial vehicle.

In some arrangements, the method further includes, prior to capturing the fixed-wing aircraft, performing a vertical takeoff maneuver in which the aerial vehicle carries the fixed-wing aircraft while achieving vertical flight. The method further includes transitioning from vertical flight to horizontal flight while the aerial vehicle continues carrying the fixed-wing aircraft, and releasing the fixed-wing aircraft while in horizontal flight to enable the fixed-wing aircraft to fly horizontally upon release.

Another embodiment is directed to operating a fixed-wing aircraft which includes flying horizontally in an independent manner while carrying a payload and, after flying horizontally in the independent manner, establishing formation flight with an aerial vehicle. The method further includes, while in formation flight with the aerial vehicle, engaging with the aerial vehicle to enable the aerial vehicle to carry the fixed-wing aircraft and land vertically while carrying the fixed-wing aircraft.

In some arrangements, the method further includes, prior to flying horizontally in the independent manner, taking off vertically while being carried by the aerial vehicle and, after taking off vertically. The method further includes transitioning from vertical flight to horizontal flight while being carried by the aerial vehicle, and detaching from the aerial vehicle while in horizontal flight to achieve horizontal flight.

Yet another embodiment is directed to an aerial vehicle that provides vertical takeoff and landing (VTOL) capabilities to an aircraft. The aerial vehicle includes a frame, and an aircraft interface coupled with the frame. The aircraft interface is constructed and arranged to physically interface with the aircraft which is external to the aerial vehicle. The aerial vehicle further includes a set of rotor assemblies coupled with the frame, and a controller supported by the frame. The controller is constructed and arranged to operate the set of rotor assemblies to provide the VTOL capabilities while the aircraft interface physically interfaces with the aircraft.

In some arrangements, the aircraft interface includes a hold/release assembly which is mounted to the frame. The hold/release assembly is responsive to a set of hold/release signals from the controller to selectively hold the aircraft to the frame and release the aircraft from the frame while the aerial vehicle is in flight.

In some arrangements, the hold/release assembly includes a set of electromagnets coupled with the frame. The set of electromagnets is constructed and arranged to control attraction of the aircraft to the frame in response to the set of hold/release signals from the controller.

In some arrangements, the hold/release assembly includes a set of suction devices coupled with the frame. The set of suction devices is constructed and arranged to control drawing of the aircraft to the frame in response to the set of hold/release signals from the controller.

In some arrangements, the hold/release assembly includes a set of latching mechanisms coupled with the frame. The set of latching mechanisms is constructed and arranged to control fastening of the aircraft to the frame in response to the set of hold/release signals from the controller.

In some arrangements, the aerial vehicle further includes a sensing assembly which is supported by the frame. The sensing assembly is constructed and arranged to provide a set of position signals to the controller to identify a position of the aircraft relative to the aerial vehicle while the aircraft and the aerial vehicle are in flight.

In some arrangements, the sensing assembly includes a farfield sensing subsystem constructed and arranged to provide a set of farfield sensing signals to the controller. The set of farfield sensing signals includes location data that enables the controller to establish formation flight between the aircraft and the aerial vehicle in response to the set of farfield sensing signals.

In some arrangements, the sensing assembly includes a nearfield sensing subsystem constructed and arranged to provide a set of nearfield sensing signals to the controller. The set of nearfield sensing signals includes relative position and velocity data that enables the controller to establish soft capture proximity between the aircraft and the aerial vehicle in response to the set of nearfield sensing signals.

In some arrangements, the nearfield sensing subsystem includes a light detection and ranging (LIDAR) subsystem. The LIDAR subsystem is constructed and arranged to provide a set of LIDAR subsystem signals to the controller to identify current position and velocity of the aircraft relative to the aerial vehicle while the aircraft and the aerial vehicle are in flight.

In some arrangements, the nearfield sensing subsystem includes a set of optical sensors. The set of optical sensors is constructed and arranged to provide a set of image signals to the controller to identify current position of the aircraft relative to the aerial vehicle while the aircraft and the aerial vehicle are in flight.

In some arrangements, the frame is constructed and arranged to carry, as the aircraft, a fixed-wing unmanned aerial vehicle (UAV) having a wing-span of at least 20 feet and an initial weight of at least 400 pounds during a vertical takeoff maneuver. One should appreciate that such arrangements present and overcome a different set of challenges than smaller aircraft such as smaller drones that can be carried, handled, etc. by a single human user.

In some arrangements, the set of rotor assemblies is constructed and arranged to fly the aerial vehicle at a horizontal speed of at least 50 miles per hour while the aerial vehicle carries the fixed-wing UAV during a release-in-flight maneuver.

In some arrangements, the frame is narrower than the wing-span of the fixed-wing UAV enabling the wing-span of the fixed-wing UAV to extend beyond the frame.

In some arrangements, the set of rotor assemblies includes at least four rotor assemblies. Each rotor assembly is constructed and arranged to provide at least 100 pounds of lift to during the vertical takeoff maneuver.

Another embodiment is directed to a fixed-wing aircraft which includes a fixed-wing structure constructed and arranged to carry a payload, an aircraft propulsion system coupled with the fixed-wing structure, and an engagement section coupled with the fixed-wing structure. The engagement section is constructed and arranged to engage with an aerial vehicle while the fixed-wing aircraft is propelled by the aircraft propulsion system during flight.

Another embodiment is directed to a multivehicle system which includes a fixed-wing aircraft and an aerial vehicle which is separate from the fixed-wing aircraft.

The fixed-wing aircraft includes:
(A) a fixed-wing structure constructed and arranged to carry a payload,
(B) an aircraft propulsion system coupled with the fixed-wing structure, and
(C) an engagement section coupled with the fixed-wing structure, the engagement section being constructed and arranged to engage with the aerial vehicle while the fixed-wing aircraft is propelled by the aircraft propulsion system during flight.

The aerial vehicle includes:
(A) a frame,
(B) an aircraft interface coupled with the frame, the aircraft interface being constructed and arranged to physically interface with the fixed-wing aircraft,
(C) a set of rotor assemblies coupled with the frame, and
(D) a controller supported by the frame, the controller being constructed and arranged to operate the set of rotor assemblies to provide the VTOL capabilities while the aircraft interface physically interfaces with the fixed-wing aircraft.

Other embodiments are directed to electronic systems and apparatus, processing circuits, computer program products, and so on. Some embodiments are directed to various methods, componentry which is involved in maneuverability between a fixed-wing aircraft and a VTOL aerial vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to releasing and/or capturing a fixed-wing aircraft using an aerial vehicle with vertical takeoff and landing (VTOL) capabilities while both aircraft are in flight. Along these lines, the VTOL aerial vehicle may take off vertically while carrying the fixed-wing aircraft (e.g., take off as a multivehicle system) and then transition to horizontal flight before releasing the fixed-wing aircraft. Upon release, the fixed-wing aircraft flies independently to perform a mission (e.g., surveillance, payload delivery, experiments/research, combinations thereof, etc.). After the fixed-wing aircraft has completed its mission, the VTOL aerial vehicle may capture the fixed-wing aircraft while both are in independent horizontal flight, and then transition to vertical flight in order to land together vertically. Such operation enables the fixed-wing aircraft to vertically take off and/or land while avoiding certain drawbacks associated with a conventional VTOL kit such as being burdened by additional weight and drag from the VTOL kit's rotors/propellers, mounting hardware, etc. during a mission which otherwise would limit the fixed-wing aircraft's maximum airspeed, ceiling, payload capacity, endurance, and so on.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
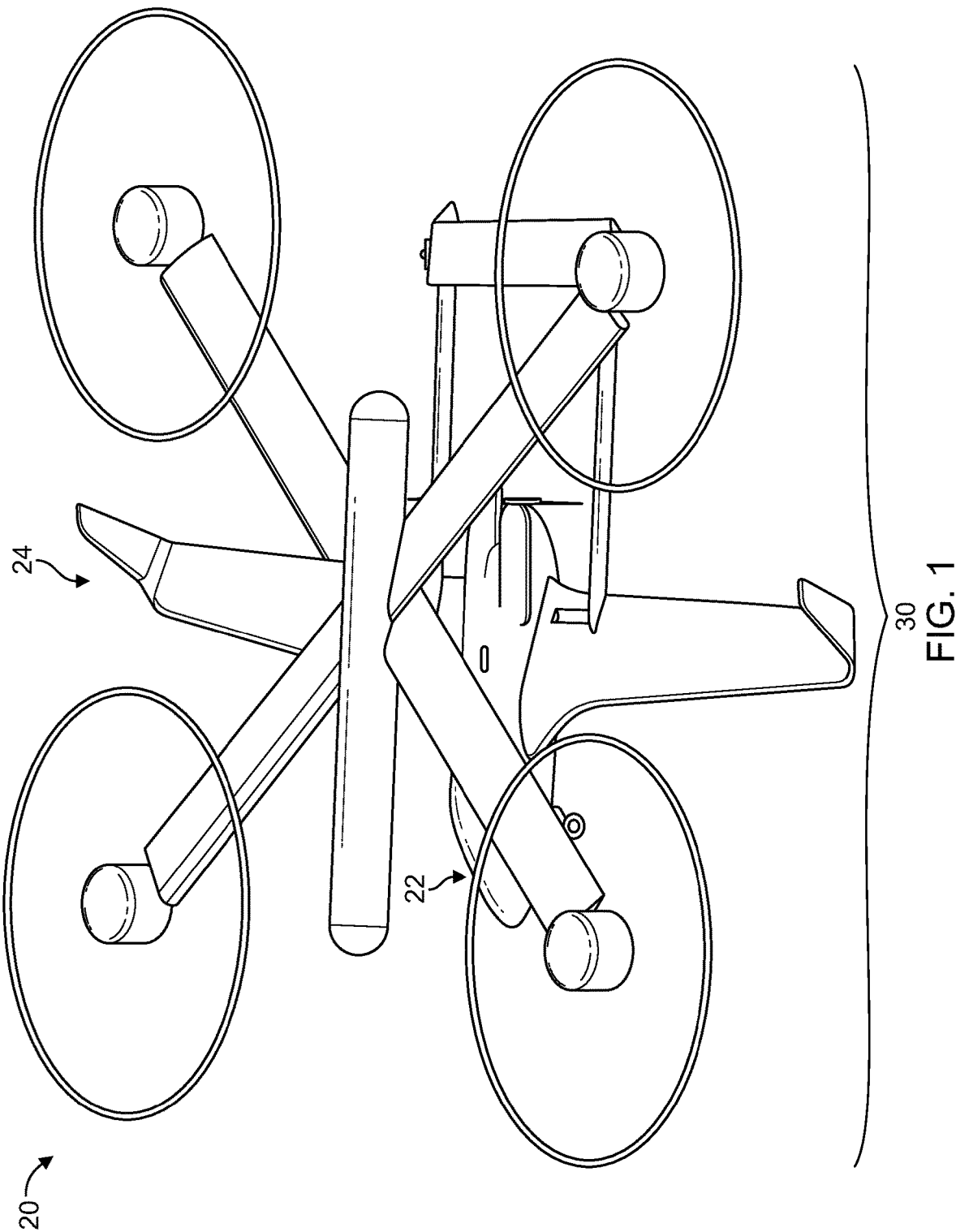
FIG. 1 is a general diagram of a multivehicle system in an attached formation in accordance with certain embodiments.
Figure 2:
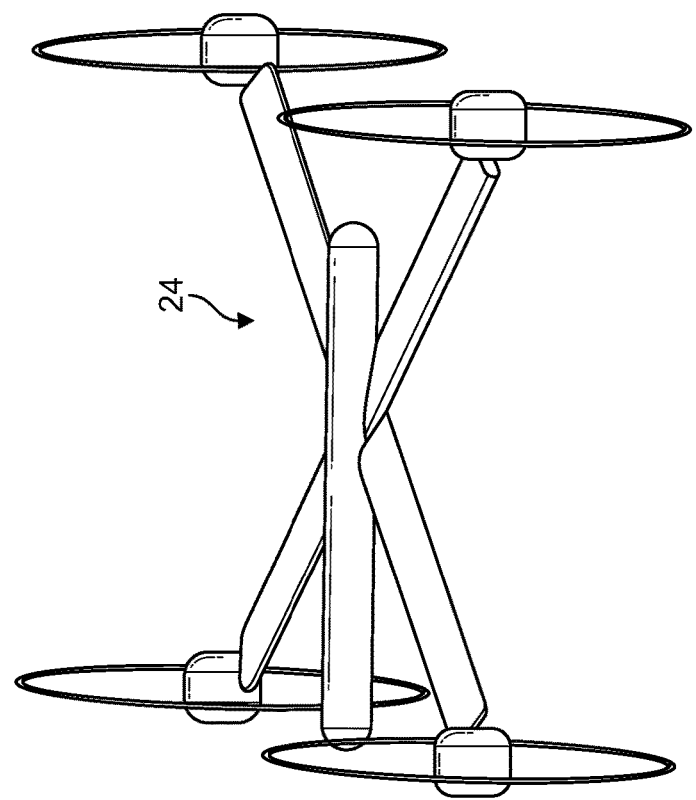
FIG. 2 is a general diagram of the multivehicle system in a detached formation in accordance with certain embodiments.
Figure 2:
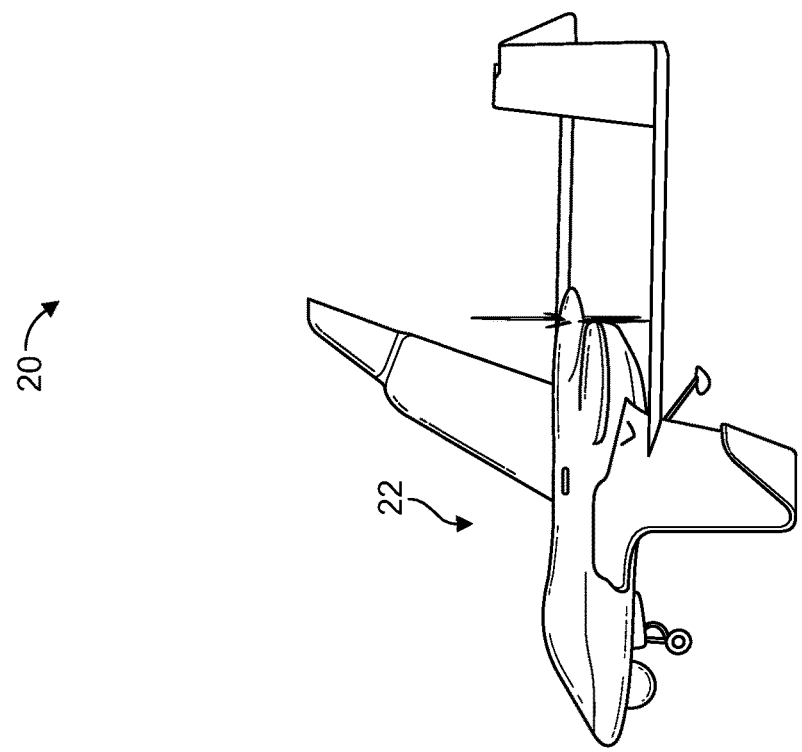
Figure 3:
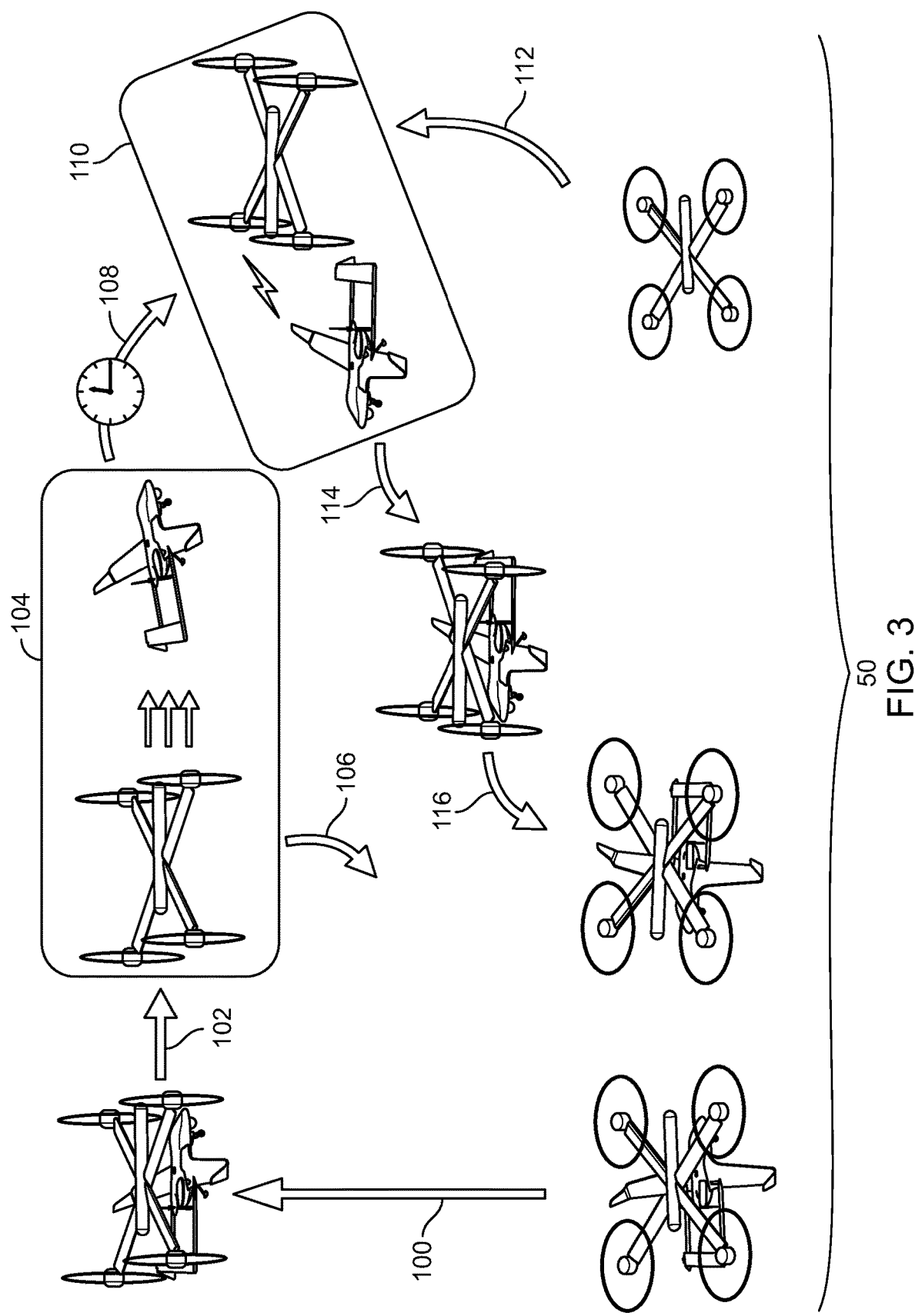
FIG. 3 is a general diagram of a collaborative release/capture sequence performed by a multivehicle system in accordance with certain embodiments.

FIGS. 1-3 show particular details of a multivehicle system 20 which includes a fixed-wing aircraft 22 and an aerial vehicle 24 having VTOL capabilities (or VTOL aerial vehicle 24). FIG. 1 shows the multivehicle system 20 in an attached formation 30 in accordance with certain embodiments. FIG. 2 shows the multivehicle system 20 in a detached formation 40 in accordance with certain embodiments. FIG. 3 shows a collaborative release/capture sequence 50 performed by the multivehicle system 20 in accordance with certain embodiments.

As shown in FIG. 1, the fixed-wing aircraft 22 and the VTOL aerial vehicle 24 of the multivehicle system 20 are constructed and arranged to fly in an attached formation 30. When the fixed-wing aircraft 22 and the VTOL aerial vehicle 24 are in the attached formation 30, the fixed-wing aircraft 22 and the VTOL aerial vehicle 24 are coupled together (e.g., secured magnetically, via suction, via mechanical linkage, combinations thereof, etc.). Nevertheless, the fixed-wing aircraft 22 and the VTOL aerial vehicle 24 are capable of robust and reliable flight. Along these lines, such attached formation flight may include taking off vertically, flying horizontally, landing vertically, and so on. Further details of such attached formation flight will be provided shortly.

As shown in FIG. 2, the fixed-wing aircraft 22 and the VTOL aerial vehicle 24 may fly in a detached formation 40. When the fixed-wing aircraft 22 and the VTOL aerial vehicle 24 are in the detached formation 40, the fixed-wing aircraft 22 and the VTOL aerial vehicle 24 are uncoupled and fly independently. In accordance with some arrangements, each of the fixed-wing aircraft 22 and the VTOL aerial vehicle 24 is capable of taking off and landing separately. That is, the fixed-wing aircraft 22 may take off independently (e.g., via a runway or launcher), may fly independently (e.g., derive lift via horizontal flight), and may land independently (e.g., via a landing strip, being caught by a net or cable, etc.), etc. Likewise, the VTOL aerial vehicle 24 may take off vertically, fly vertically and/or horizontally, and/or land vertically (e.g., via operation of multiple rotors).

It should be understood that, in accordance with certain embodiments, the VTOL aerial vehicle 24 includes rotors which are capable of pivoting for enhanced thrust direction control (e.g., see FIGS. 1 and 2). Such a feature enables the VTOL aerial vehicle 24 to conveniently transition between vertical flight where the rotors provide thrust in the vertical direction, and horizontal flight where rotors provide thrust in the horizontal direction and wing surfaces of the VTOL aerial vehicle 24 provide lift. During such transition, the bodies of both vehicles may maintain their original orientation without any significant change in pitch, yaw, roll, etc.

During operation, the fixed-wing aircraft 22 and the VTOL aerial vehicle 24 of the multivehicle system 20 are able to work cooperatively (e.g., coordinate thrust, control surfaces, etc.). Along these lines, the fixed-wing aircraft 22 and the VTOL aerial vehicle 24 are capable of flying together (e.g., see the attached formation 30 of FIG. 1) and/or independently (e.g., see the detached formation 40 of FIG. 2). Additionally, the fixed-wing aircraft 22 and the VTOL aerial vehicle 24 may take off and land together and/or separately. Furthermore, the specialized features of the multivehicle system 20 enable the fixed-wing aircraft 22 and the VTOL aerial vehicle 24 to transition between the attached formation 30 and the detached formation 40 while in flight.

Along these lines and as shown in FIG. 3, the fixed-wing aircraft 22 and the VTOL aerial vehicle 24 of the multivehicle system 20 are capable of performing the earlier-mentioned collaborative release/capture sequence 50. In accordance with certain embodiments, the VTOL aerial vehicle 24 sits on top of the fixed-wing aircraft 22 to carry the fixed-wing aircraft 22 from above. In accordance with other embodiments, the VTOL aerial vehicle 24 sits underneath the fixed-wing aircraft 22 to support the fixed-wing aircraft 22 from below.

The collaborative release/capture sequence 50 begins with the fixed-wing aircraft 22 and the VTOL aerial vehicle 24 coupled together in the attached formation 30 prior to takeoff (also see FIG. 1). At this time, both vehicles may be fully charged, fully provisioned/equipped for missions, at maximum weight, etc.

At 100 (FIG. 3), while the fixed-wing aircraft 22 and the VTOL aerial vehicle 24 are in the attached formation 30, the multivehicle system 20 takes off. Here, the rotors of the VTOL aerial vehicle 24 provide vertical thrust enabling the entire multivehicle system 20 to takeoff vertically. Such operation enables the multivehicle system 20 to become airborne from a tight takeoff location (e.g., while surrounded by trees, buildings, other obstructions, from a ship on the water, combinations thereof, etc.) and without specialized equipment such as a launch ramp. Eventually, the multivehicle system 20 reaches a target height or altitude (e.g., as part of a mission or flight plan, as determined by a user manually operating the multivehicle system 20, etc.).

At 102, the multivehicle system 20 transitions from vertical flight to horizontal flight. Here, a set of rotors of the fixed-wing aircraft 22 (e.g., one or more rotors) provides propulsion in the horizontal direction. In accordance with some embodiments, at least some of the rotors of the VTOL aerial vehicle 24 pivot to also provide propulsion in the horizontal direction. During this time, wing surfaces of the fixed-wing aircraft 22 and the VTOL aerial vehicle 24 provide lift (i.e., aerodynamic force produced by the motion of the fixed-wing aircraft 22 and the VTOL aerial vehicle 24 through the air).

Once the multivehicle system 20 is at the target altitude and has reached a target horizontal flight speed, the VTOL aerial vehicle 24 releases the fixed-wing aircraft 22 as shown at 104 of FIG. 3. Further details of the release process will be provided shortly. Upon release, the fixed-wing aircraft 22 and the VTOL aerial vehicle 24 are now in the detached formation 40 (also see FIG. 2) and fly independently (e.g., in response to predefined flight plans, in response to manual control, combinations thereof, etc.).

By way of example and as illustrated by arrow 106, the VTOL aerial vehicle 24 returns to the launch area and lands vertically. In accordance with certain embodiments, the primary mission of the VTOL aerial vehicle 24 may be to takeoff and/or land while in the attached formation 30 with the fixed-wing aircraft 22 thus enabling the VTOL aerial vehicle 24 to be optimized for such tasks.

Further by way of example and as illustrated by arrow 108, the fixed-wing aircraft 22 may perform one or more missions such as perform surveillance, carry/deliver a set of payloads, perform experiments, combinations thereof, etc. Such operation may be over an extended period of time after the VTOL aerial vehicle 24 has landed (e.g., while the VTOL aerial vehicle 24 is being recharged and/or refueled).

Later, at 110, the fixed-wing aircraft 22 and the VTOL aerial vehicle 24 rendezvous with each other. Here, as shown by arrow 112, if the VTOL aerial vehicle 24 had landed, the VTOL aerial vehicle 24 takes off and flies to a rendezvous location. In accordance with certain embodiments, the fixed-wing aircraft 22 and the VTOL aerial vehicle 24 communicate with each other (e.g., directly, through a central control station, combinations thereof, etc.) to identify their initial positions and close in on each other. Such maneuvering may be via an automated procedure, manually, or a combination of automated and manual control.

At 114, the VTOL aerial vehicle 24 captures the fixed-wing aircraft 22 while both vehicles are in flight. Further details of the capture process will be provided shortly. Upon capture, the fixed-wing aircraft 22 and the VTOL aerial vehicle 24 of the multivehicle system 20 fly in the attached formation 30 (also see FIG. 1). It should be understood that the fixed-wing aircraft 22 and the VTOL aerial vehicle 24 may have been flying horizontally prior to capture and immediately after capture.

At 116, the multivehicle system 20 transitions from horizontal flight to vertical flight. Here, the set of rotors of the fixed-wing aircraft 22 may no longer provide propulsion in the horizontal direction or simply provide enough propulsion in the horizontal direction to stabilize the multivehicle system 20 and prevent undesired rotation as the multivehicle system 20 begins to hover. Additionally, the rotors of the VTOL aerial vehicle 24 provide enough vertical lift to enable the multivehicle system 20 to safely descend and land. In accordance with certain embodiments, the rotors of the VTOL aerial vehicle 24 pivot to provide robust and reliable controlled flight until landing.

It should be understood that the multivehicle system 20 may perform all or parts of the collaborative release/capture sequence 50. For example, the fixed-wing aircraft 22 and the VTOL aerial vehicle 24 may takeoff in the attached formation 30 but land separately. As another example, the fixed-wing aircraft 22 and the VTOL aerial vehicle 24 may takeoff separately, but rendezvous in flight and land in the attached formation 30, and so on.

It should be further understood that the fixed-wing aircraft 22 and the VTOL aerial vehicle 24 may communicate with a ground station during all or parts of the collaborative release/capture sequence 50. Such operation enables one or more users to impose manual control as desired, change flight plans, override particular operations in real-time, and so on. Further details will now be provided with reference to FIG. 4.

Figure 4:
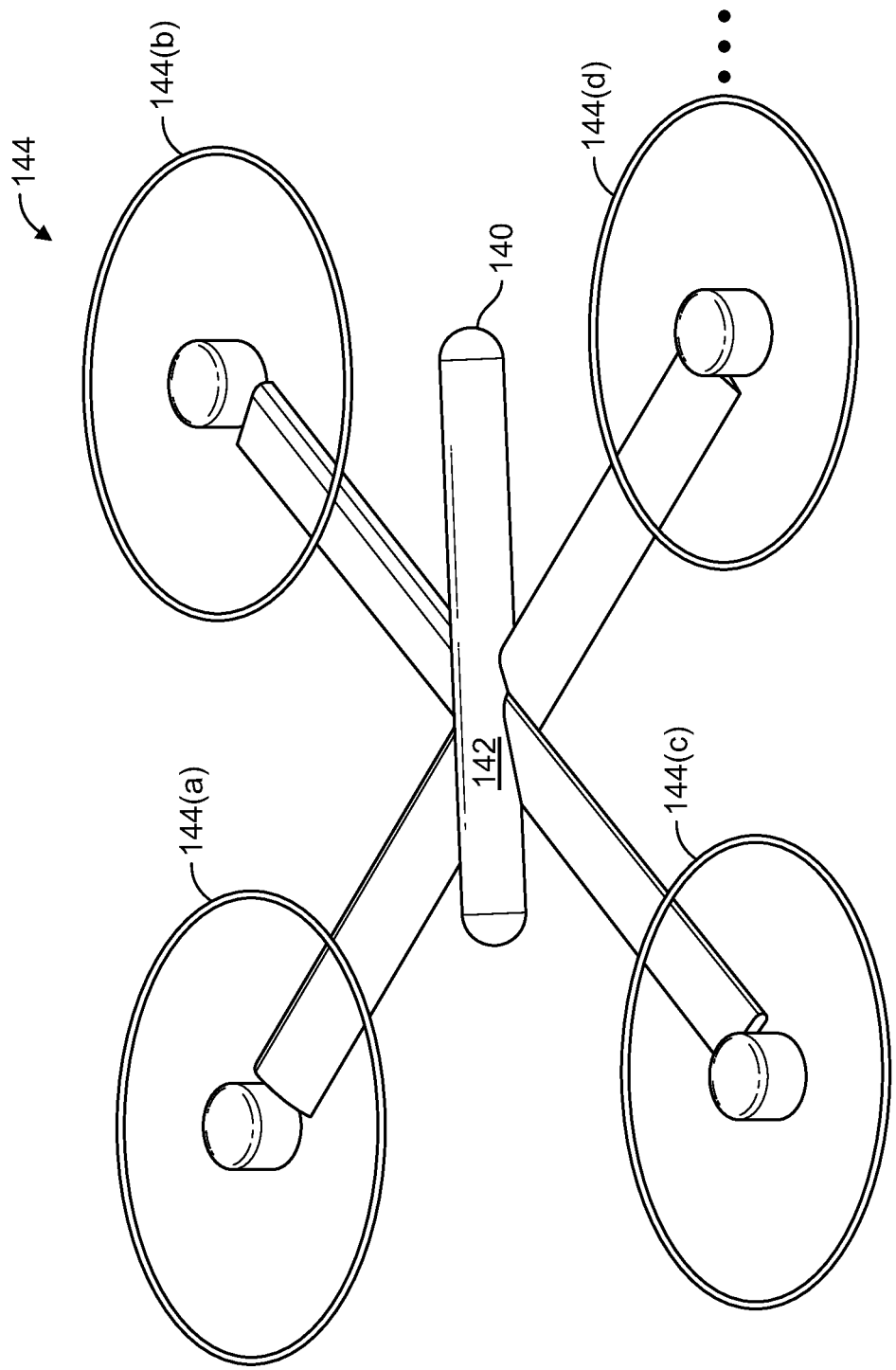
FIG. 4 is a perspective view of a VTOL aerial vehicle of the multivehicle system in accordance with certain embodiments.

FIG. 4 shows particular details of the VTOL aerial vehicle 24 in accordance with certain embodiments. The VTOL aerial vehicle 24 includes a frame 140, an aircraft interface 142, a set of rotor assemblies 144(a), 144(b), 144(c), 144(d), . . . (collectively, rotors 144), and a controller 146.

The frame 140 is constructed and arranged to provide support for particular componentry of the VTOL aerial vehicle 24 such as the aircraft interface 142, the rotors 144, the controller 146, and so on. In some arrangements, the frame 140 provides aerodynamic flight surfaces that provide lift and/or stability to the VTOL aerial vehicle 24 while the VTOL aerial vehicle 24 moves through the air.

The aircraft interface 142 is constructed and arranged to physically interface the frame 140 of the VTOL aerial vehicle 24 with the fixed-wing aircraft 22 (e.g., see FIGS. 1-3) which is external to VTOL aerial vehicle 24. Along these lines, the aircraft interface 142 of the VTOL aerial vehicle 24 may engage with and/or disengage from the fixed-wing aircraft 22 while both are not in flight (e.g., on the ground before or after flight) and/or while in flight (e.g., see FIG. 3).

The rotors 144 are constructed and arranged to provide lift to the VTOL aerial vehicle 24. In certain embodiments, the rotors 144 are further constructed and arranged to provide horizontal propulsion to the VTOL aerial vehicle 24 for horizontal flight. In some arrangements, at least some of the rotors 144 are able to independently pivot relative to the frame 140 to enable robust and reliable maneuverability (e.g., convenient transitions between horizontal and vertical flight, effective hovering under windy conditions, precision flight and station keeping relative to the fixed-wing aircraft 22, and so on). Although the VTOL aerial vehicle 24 is shown as having four rotors 144, the VTOL aerial vehicle 24 may include a different number of rotors 144 (e.g., one, two, three, five, six, seven, eight, nine, ten, etc.). In some arrangements, four rotors 144 are sufficient, but additional rotors 144 are or may be included for redundancy/fault tolerance.

The controller 146 is constructed and arranged operate various componentry of the VTOL aerial vehicle 24 such as the aircraft interface 142, the rotors 144, and so on. To this end, the controller 146 may be preprogrammed to execute a flight plan, communicate with another device (e.g., a base station on the ground) to fly the VTOL aerial vehicle 24 under manual control, combinations thereof, etc. Additionally, the controller 146 may cooperate with the fixed-wing aircraft 22 to fly in the attached formation 30 (e.g., where the aircraft interface 142 physically interfaces with the fixed-wing aircraft 22) and/or the detached formation 40, as well as perform release and/or capture operations. Further details will now be provided with reference to FIGS. 5-9.

Figure 5:
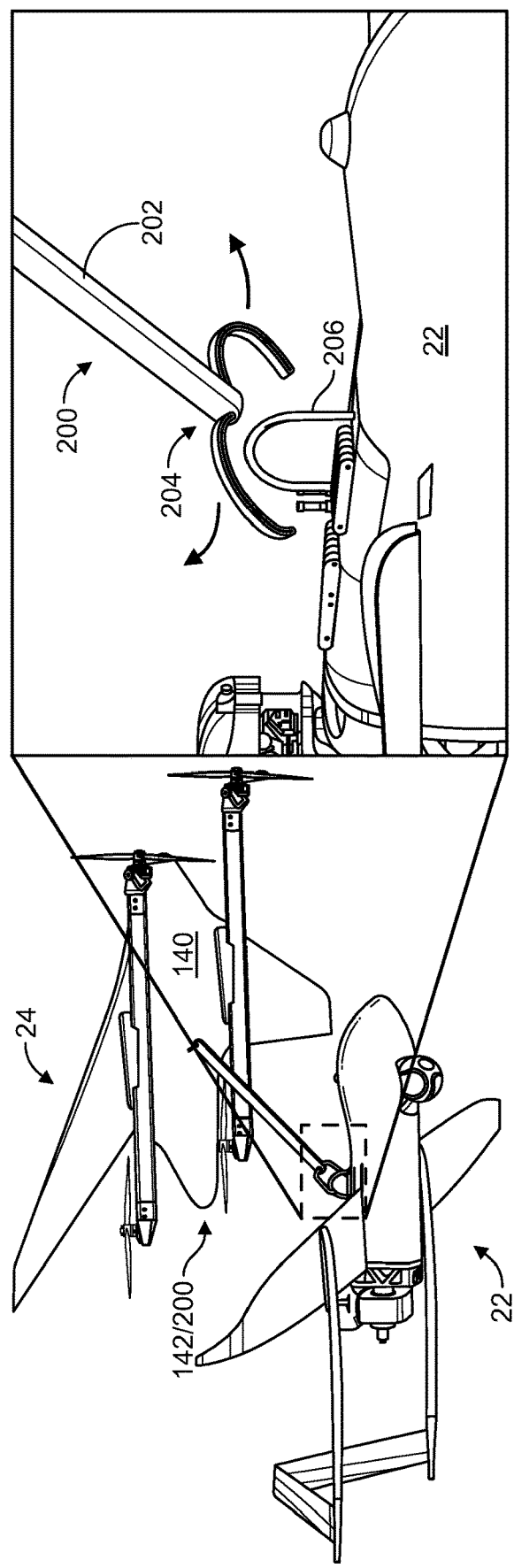
FIG. 5 is a view of a capture boom in accordance with certain embodiments.
Figure 6:
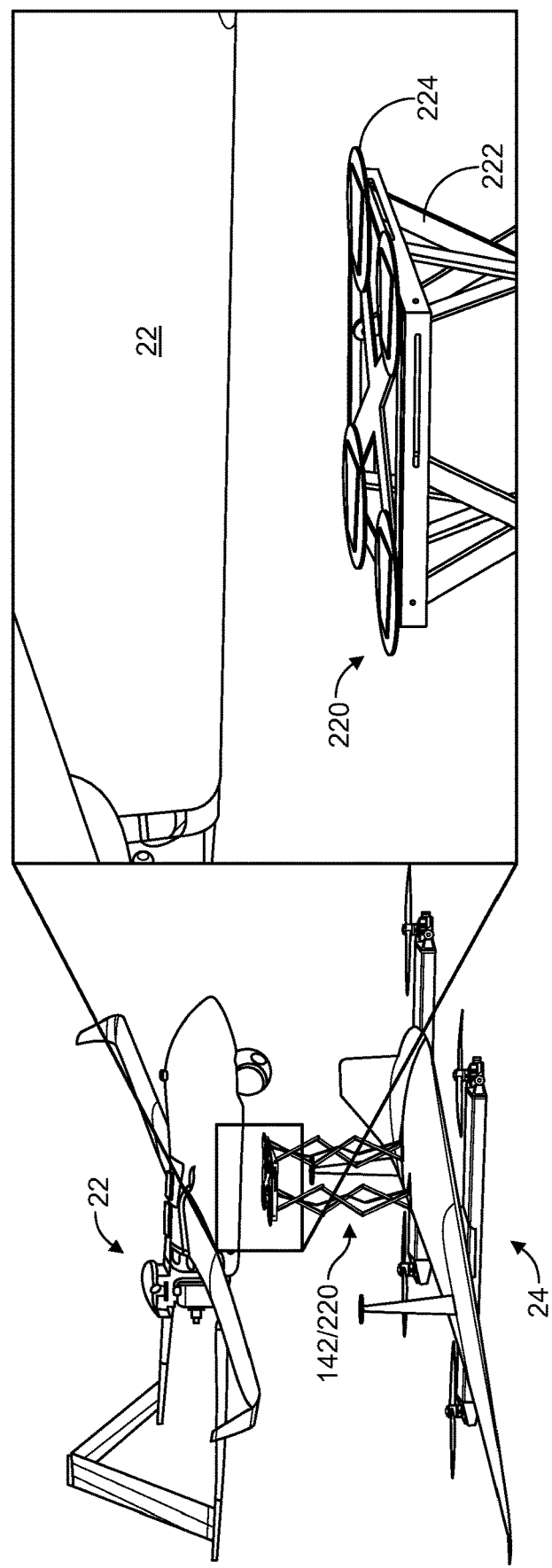
FIG. 6 is a view of a trapeze/truss assembly in accordance with certain embodiments.
Figure 7:
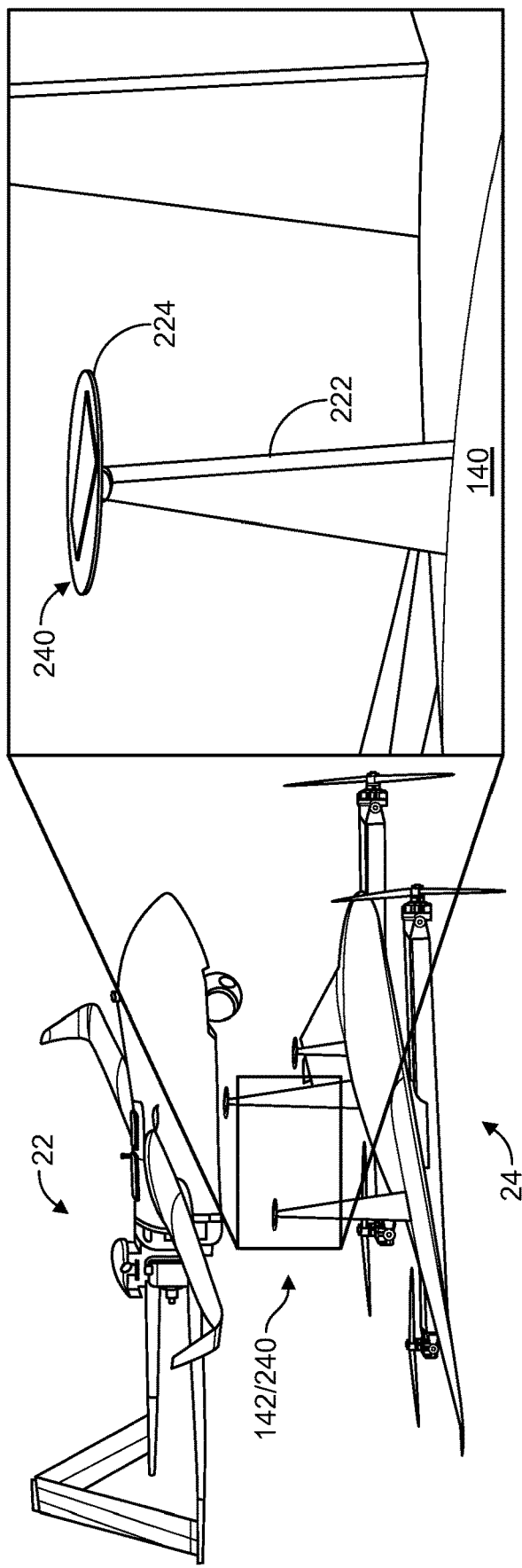
FIG. 7 is a view of an array of magnetic supports in accordance with certain embodiments.
Figure 8:
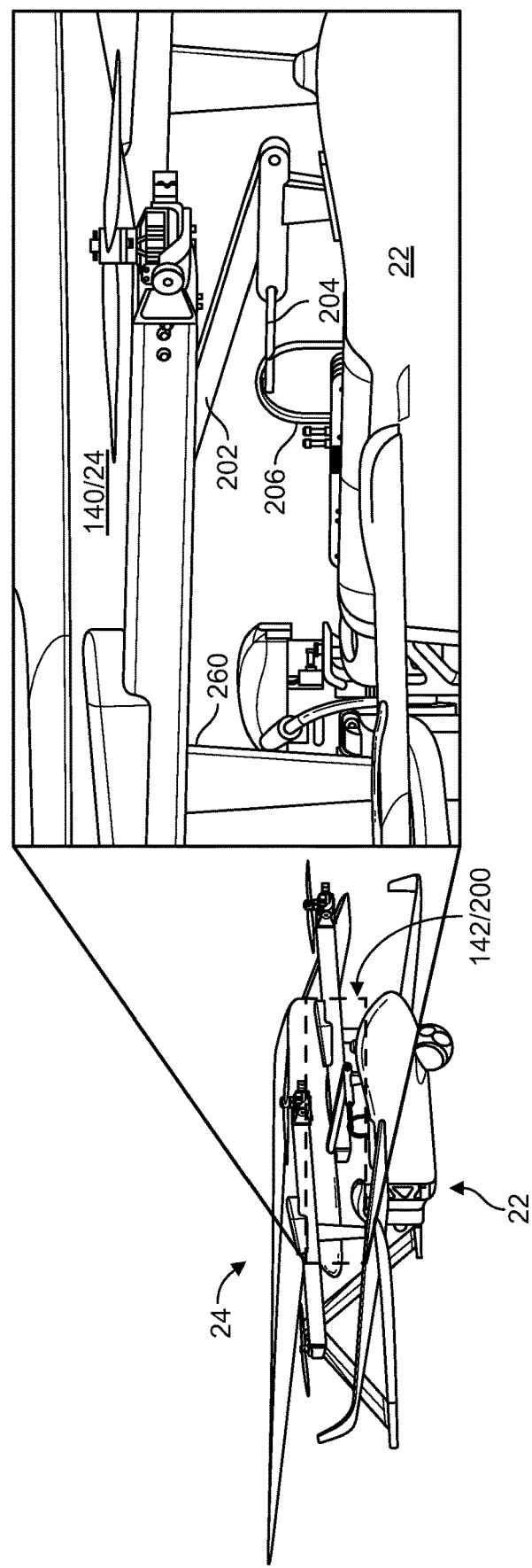
FIG. 8 is a view of further details of the capture boom in accordance with certain embodiments.
Figure 9:
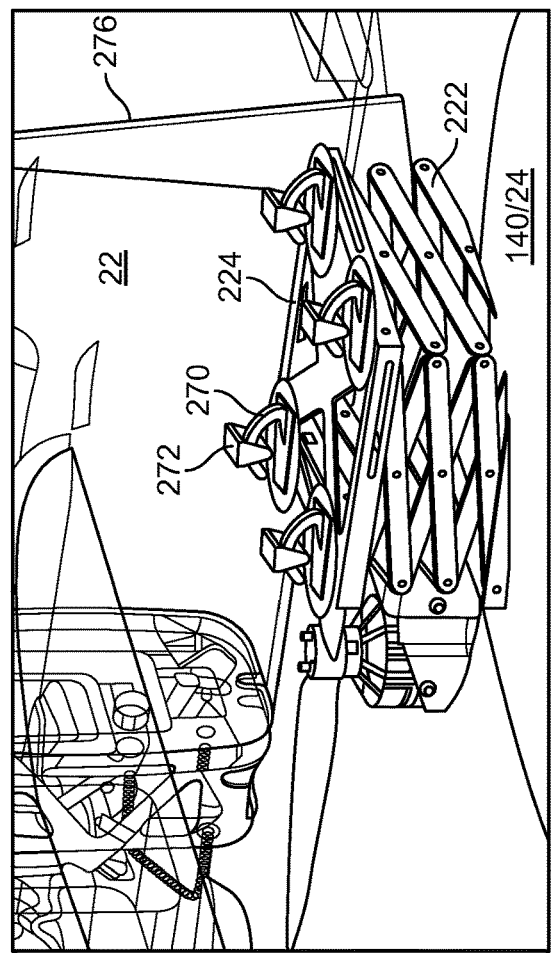
FIG. 9 is a view of further details of the trapeze/truss assembly in accordance with certain embodiments.
Figure 9:
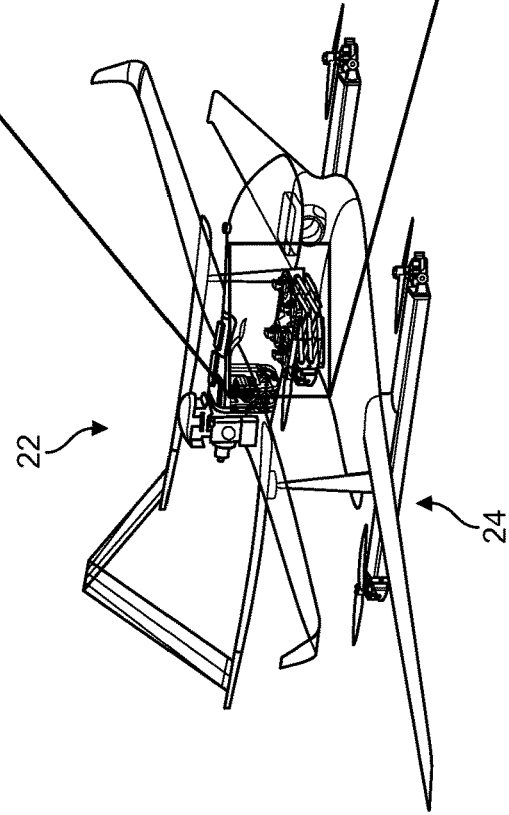
Figure 10:
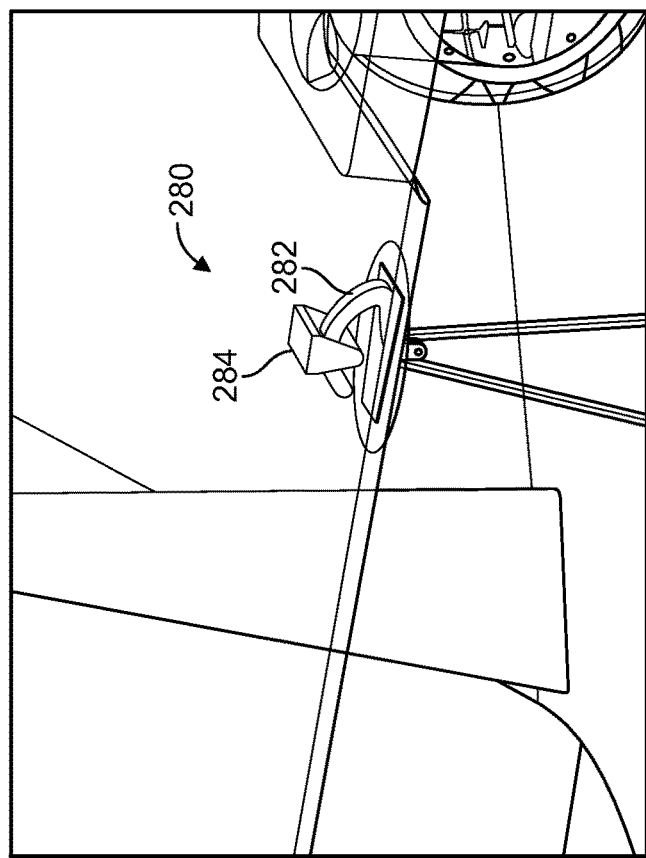
FIG. 10 is a view of further details of the array of magnetic supports in accordance with certain embodiments.
Figure 10:
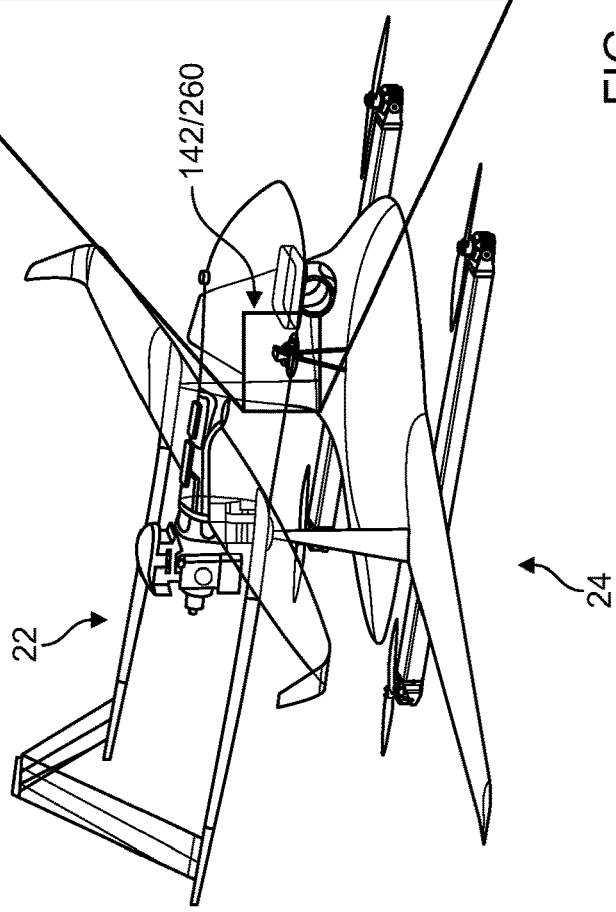

FIGS. 5-10 show various aircraft interfacing details of the multivehicle system 20 in accordance with certain embodiments (also refer to the aircraft interface 142 in FIG. 4). To this end, it should be understood that the capture process may occur in two stages, i.e., a soft capture stage (e.g., FIGS. 5-7) followed by a hard capture stage (e.g., FIGS. 8-10). FIG. 5 shows a capture boom 200 in accordance with certain embodiments. FIG. 6 shows a trapeze/truss assembly 220 in accordance with certain embodiments. FIG. 7 shows a magnet array in accordance with certain embodiments. FIG. 8 shows further details of the capture boom 200 in accordance with certain embodiments. FIG. 9 shows further details of the trapeze/truss assembly 220 in accordance with certain embodiments. FIG. 10 shows further details of the magnet array in accordance with certain embodiments.

It should be understood that the multivehicle system 20 may include one the hold/release features described in connection with FIGS. 5-10, a combination of multiple hold/release features described in connection with FIGS. 5-10, and/or other hold/release features. Such features facilitate a release maneuver and/or a capture maneuver performed between the fixed-wing aircraft 22 and the VTOL aerial vehicle 24 of the multivehicle system 20.

It should be further understood that such features work regardless of which vehicle is over the other. By way of example only, the VTOL aerial vehicle 24 is shown over the fixed-wing aircraft 22 in certain figures. Additionally, by way of example only, the VTOL aerial vehicle 24 is shown under the fixed-wing aircraft 22 in other figures.

With regard to soft capture, the fixed-wing aircraft 22 and the VTOL aerial vehicle 24 of the multivehicle system 20 start in the detached formation 40 and close in on each other. To this end, the VTOL aerial vehicle 24 is capable of accelerating up to the flight speed of the fixed-wing aircraft 22 (i.e., achieve dash speed). As will be explained in further detail shortly, the fixed-wing aircraft 22 and the VTOL aerial vehicle 24 may rely on sensors, positioning circuitry, and precision flight control to reach close proximity. Once within a predefined distance of each other (e.g., a meter), the multivehicle system 20 executes an electronic soft capture operation in which the fixed-wing aircraft 22 and the VTOL aerial vehicle 24 couple together in the attached formation 30.

With reference to FIG. 5 and by way of example, the aircraft interface 142 of the VTOL aerial vehicle 24 includes a capture boom 200 having an arm 202 and a clamp mechanism 204 supported by the arm 202. The arm 202 extends outwardly from the frame 140 of the VTOL aerial vehicle 24 and positions the clamp mechanism 204 for release and/or capture maneuvers. The clamp mechanism 204 actuates between an open state to release the fixed-wing aircraft 22 and a closed state to capture the fixed-wing aircraft 22. In some arrangements, the clamp mechanism 204 takes the form of an articulating hook.

In accordance with certain embodiments, the fixed-wing aircraft 22 includes a passive locking receptacle 206 (e.g., a lug, a ring, a hoop, a hook, a loop, a bar, a catch, etc.). The passive locking receptacle 206 interfaces with the clamp mechanism 204. The passive locking receptacle 206 may have a low or streamline profile so there is little or no drag or interference provided during flight.

Furthermore, in accordance with certain embodiments, the arm 202 is retractable and operates in a manner similar to that of a retractable flying boom that is used in standard flying-boom air refueling situations. Along these lines, the two aircraft may perform stationkeeping maneuvers while the VTOL aerial vehicle 24 extends the capture boom 200 toward a passive locking receptacle on the fixed-wing aircraft 22. The clamp mechanism 204 at the end of the capture boom 200 may include a hook, magnet, magnetically attractive object, or mechanical suction device attached to the arm 202 with a universal or ball joint, that engages a lug, magnetically attractive object, magnet, or hardpoint on the captured vehicle to provide the first physical connection between the two aircraft.

During release operation, the clamp mechanism 204 transitions from the closed state to the opened state to release the fixed-wing aircraft 22 from the VTOL aerial vehicle 24 (e.g., in the direction of the arrows in the inset of FIG. 5). When the transition occurs during flight, the fixed-wing aircraft 22 from the VTOL aerial vehicle 24 are able to fly independently.

Additionally, during capture, the clamp mechanism 204 transitions from the opened state to the closed state to couple the fixed-wing aircraft 22 to the VTOL aerial vehicle 24 (e.g., in the opposite direction of the arrows in the inset of FIG. 5). When the transition occurs during flight, the fixed-wing aircraft 22 remains captured by the VTOL aerial vehicle 24.

In accordance with some embodiments and as will be explained in further detail shortly, closure of the clamp mechanism 204 results in soft capture of the fixed-wing aircraft 22 by the VTOL aerial vehicle 24. The VTOL aerial vehicle 24 then performs a hard capture operation to more rigidly connect with the fixed-wing aircraft 22 before hovering and landing vertically in response to operation of the rotors 144 of the VTOL aerial vehicle 24 (also see FIG. 4).

One should appreciate that the above-described arm-style hold/release assembly 200 is sufficient to enable the multivehicle system 20 to fully or partially perform the above-described collaborative release/capture sequence 50 (also see FIG. 3). One should further appreciate that the above-described arm-style hold/release assembly 200 may operate in combination with other aircraft interfacing mechanisms described herein.

With reference to FIG. 6 and by way of example, the aircraft interface 142 of the VTOL aerial vehicle 24 includes a trapeze/truss assembly 220 having an extender portion 222 and an interfacing portion 224 supported by the extender portion 222. The extender portion 222 extends outwardly from the frame 140 of the VTOL aerial vehicle 24 and positions the interfacing portion 224 for release and/or capture maneuvers. The interfacing portion 224 is constructed and arranged to attach directly to the fixed-wing aircraft 22.

In accordance with certain embodiments, the extender portion 222 operates in a similar manner to that of an extension assembly used in standard parasite aircraft missions. Here, the fixed-wing aircraft 22 provides a prescribed flight profile, while the VTOL aerial vehicle 24 matches the profile and actively flies the trapeze/truss assembly 220 toward its mate aboard the fixed-wing aircraft 22. The interfacing portion 224 includes a hook, magnet, or magnetically attractive object, etc. that engages a lug, magnetically attractive object, or magnet on the fixed-wing aircraft 22 to provide a physical connection between the two aircraft.

One should appreciate that the above-described trapeze/truss assembly 220 is sufficient to enable the multivehicle system 20 to fully or partially perform the above-described collaborative release/capture sequence 50 (also see FIG. 3). One should further appreciate that the above-described trapeze/truss assembly 220 may operate in combination with other aircraft interfacing mechanisms described herein.

With reference to FIG. 7 and by way of example, the aircraft interface 142 of the VTOL aerial vehicle 24 includes an array of magnetic supports 240 which includes a set of support members 242 and a set of electromagnets 244 supported by the set of support members 242. The support members 242 individually extend from the frame 140 of the VTOL aerial vehicle 24 to position the electromagnets 244 for release and/or capture maneuvers. The electromagnets 244 are constructed and arranged to magnetically attach directly to the fixed-wing aircraft 22 in response to a set of control signals.

In accordance with certain embodiments, the electromagnets 240 of the magnet array 240 correlate (or correspond) to an array of electromagnets on the fixed-wing aircraft 22. Along these lines, the arrays of electromagnets on both vehicles, may take a complex arrangement of shapes, locations, and polarities such that the electromagnets self-align and attract each other in a complimentary manner when the aircrafts meet minimum position and alignment constraints. Here, the fixed-wing aircraft 22 performs a prescribed flight profile, while the VTOL aerial vehicle 24 maneuvers increasingly close to the fixed-wing aircraft 22 until the electromagnetic arrays approach each other closely enough to self-align and engage each other, providing the first physical connection between the two aircraft.

In some embodiments, the electromagnets on the fixed-wing aircraft 22 are mounted directly onto the body of the fixed-wing aircraft 22. In such embodiments, the support members 242 of the magnet array 240 of the VTOL aerial vehicle 24 serve as support pylons enabling the electromagnets 244 to reach the electromagnets on the fixed-wing aircraft 22. Optionally, the support members 242 may retract into an interior cavity defined by the frame 140 of the VTOL aerial vehicle 24 (e.g., to protect the magnet array 240 prior to use, to reduce drag, etc.).

As described above with respect to soft capture, the fixed-wing aircraft 22 and the VTOL aerial vehicle 24 align closely and couple together so that the multivehicle system 20 has achieved the attached formation 30. At this point, the fixed-wing aircraft 22 and the VTOL aerial vehicle 24 may perform a hard capture operation to more firmly connect the two aircraft together to form a single, integrated unit that can be transitioned to a vertical landing. For example, a secondary set of mechanical constraints can be engaged to firmly lock the two aircraft together.

FIG. 8 shows further operational details of the capture boom 200 (also see FIG. 5). As described earlier in connection with FIG. 5, the clamp mechanism 204 closes to secure to the passive locking receptacle 206 thus achieving soft capture. Such operation results in a single point of contact between the two aircraft.

At this point and for hard capture, the arm 202 of the capture boom 200 pulls the two aircraft closer to each other until additional points of contact are achieved to provide further stability and rigidity, i.e., to prevent undesirable/uncontrolled movements between the two aircraft. For example, the VTOL aerial vehicle 24 may further include a set of support members or stanchions 260 adapted to further contact the fixed-wing aircraft 22 during the hard capture stage.

In some arrangements, the arm 202 articulates toward the frame 140 of the VTOL aerial vehicle 24, causing the separation between the two aircraft to close until the two vehicles are touching at predetermined cushion points. Other alternatives are suitable as well such as retracting the arm toward and/or into the frame 140 of the VTOL aerial vehicle 24. Tension at the soft capture point ensures positive contact between the two aircraft, while the cushion points prevent relative motion.

FIG. 9 shows further operational details of the trapeze/truss assembly 220 (also see FIG. 6). Recall that the trapeze/truss assembly 220 extends outwardly from the frame 140 of the VTOL aerial vehicle 24 during soft capture. Here, a soft joint between the two aircraft is the interfacing portion 224 (e.g., the top plate) of the trapeze/truss assembly 220.

Next and for hard capture, lugs 270 on one aircraft (e.g., the VTOL aerial vehicle 24) engage receptacles 272 on the second aircraft (e.g., the fixed-wing aircraft 22) to provide a secure mechanical joint between the two aircraft. The extender portion 222 of the trapeze/truss assembly 220 is then retracted toward the frame 140 of the VTOL aerial vehicle 24, causing the separation between the two aircraft to close.

Additionally, a set of support members or stanchions 276 may provide additional stabilization. That is, each stanchions 276 serves as an additional point of contact (e.g., a cushion point) external to the truss for added stabilization.

FIG. 10 shows further operational details of the array of magnetic supports 240 (also see FIG. 7). Recall that each magnetic support 240 extends outwardly from the frame 140 of the VTOL aerial vehicle 24. During soft capture, the electromagnets 244 work to position and align the two aircraft closely enough to begin hard capture.

Next, hard capture involves actuation of a reversible locking feature 280 that mates the two aircraft together mechanically. Such a locking feature 280 may be provided by one or more of the magnetic supports 240 extending from the VTOL aerial vehicle 24.

In accordance with certain embodiments and as shown in FIG. 10, the locking feature 280 includes a rotating hook 282 that engages a clevis pin 284 submerged within the fixed-wing aircraft 22. This feature can also take other geometries such as a T-shaped pin that rotates into position, a solenoid-driven linear pin that extends through a lug in the fixed-wing aircraft 22, or any other implementation that performs the locking function simply and reliably.

As mentioned earlier, the various interfacing mechanisms described above may be combined and/or work with other interfacing mechanisms. Furthermore, it should be understood that during release, the mechanisms may work in manners that are opposite that for capture. Further details will now be provided with reference to FIG. 11.

Figure 11:
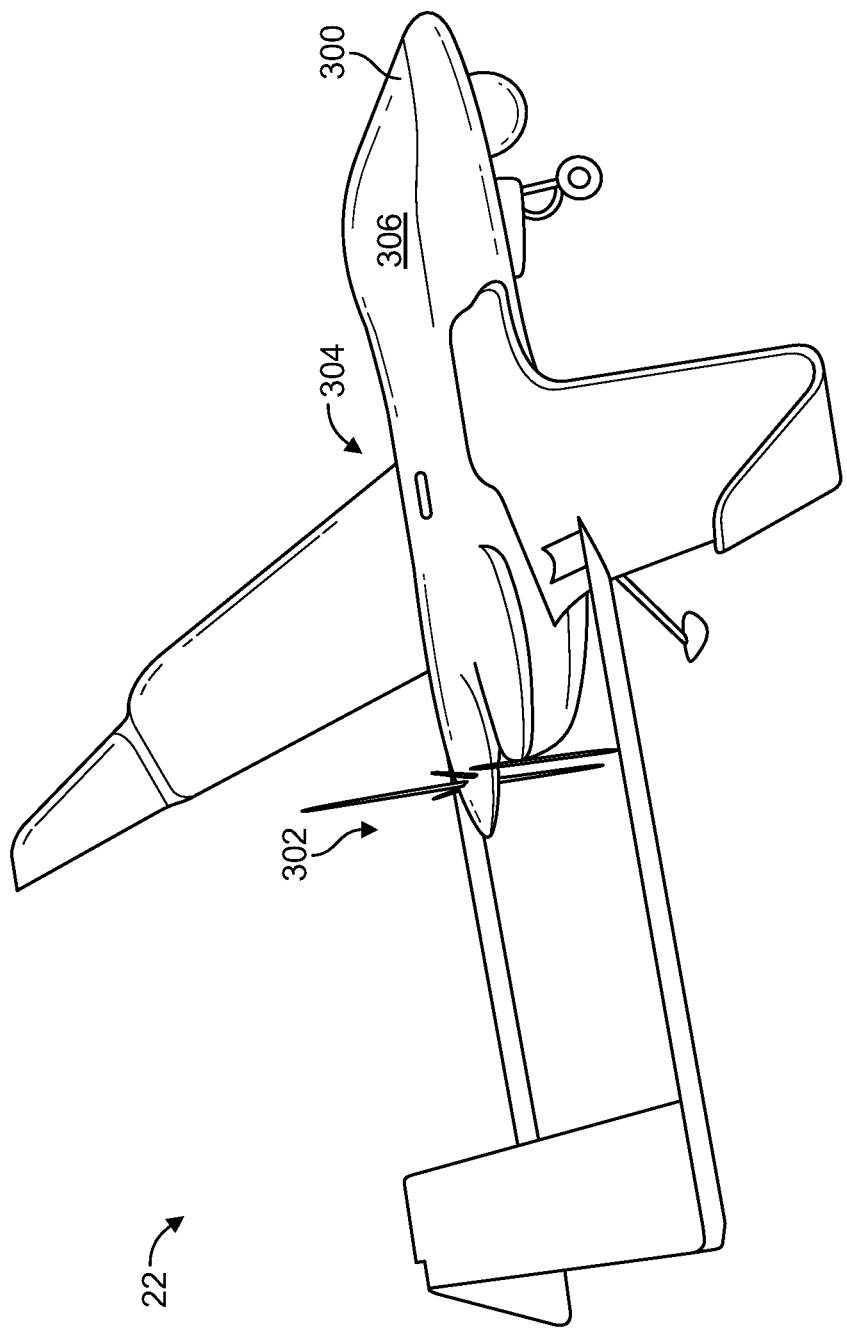
FIG. 11 is a perspective view of a fixed-wing aircraft of the multivehicle system in accordance with certain embodiments.

FIG. 11 shows certain details of the fixed-wing aircraft 22 in accordance with certain embodiments. The fixed-wing aircraft 22 includes a fixed-wing structure (or fuselage) 300, an aircraft propulsion system 302, an engagement section 304, and control circuitry 306.

The fixed-wing structure 300 defines a set of fixed-wings including control surfaces (e.g., airlerons, flaps, etc.) to provide lift in response to horizontal propulsion. Additionally, the fixed-wing structure 300 is constructed and arranged to carry a payload. Examples of suitable payloads include surveillance equipment, munitions, experiment/test equipment, cargo in transit, combinations thereof, and so on. Furthermore, the fixed-wing structure 300 provides protection for various fixed-wing aircraft componentry such as the control circuitry 306, fuel tanks, batteries, cargo, etc.

The aircraft propulsion system 302 is supported by the fixed-wing structure 300 and provides propulsion for flight. To this end, the aircraft propulsion system 302 may include a set of rotors (e.g., a set of engines and propellers) under control of the control circuitry 306.

The engagement section 304 is coupled with or integrated with the fixed-wing structure 300. The engagement section 304 is constructed and arranged to engage with VTOL aerial vehicle 24 while the fixed-wing aircraft 22 is propelled by the aircraft propulsion system 302 during flight. In accordance with certain embodiments, the engagement section 304 includes electromagnets, mechanical attachment features, suction features, combinations thereof, etc.

In some arrangements, the engagement section 304 is accessible from a top of the fixed-wing aircraft 22 (also see FIGS. 5 and 8). In other arrangements, the engagement section 304 is accessible from a bottom of the fixed-wing aircraft 22 (also see FIGS. 6-7 and 9-10).

The control circuitry 306 is constructed and arranged electronically operate various componentry of the fixed-wing aircraft 22 such as the propulsion system 302, control surfaces, payload equipment, etc. To this end, the control circuitry 306 may be preprogrammed to execute a flight plan, communicate with another device (e.g., a base station on the ground) to fly the fixed-wing aircraft 22 under manual control, combinations thereof, etc. Additionally, the control circuitry 306 may cooperate with the VTOL aerial vehicle 24 to fly in the attached formation 30 (e.g., where the engagement section 304 physically interfaces with the VTOL aerial vehicle 24) and/or the detached formation 40, as well as perform release and/or capture operations. Further details will now be provided with reference to FIG. 12.

Figure 12:
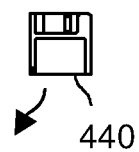
FIG. 12 is a view of certain electronic circuitry details in accordance with certain embodiments.
Figure 12:
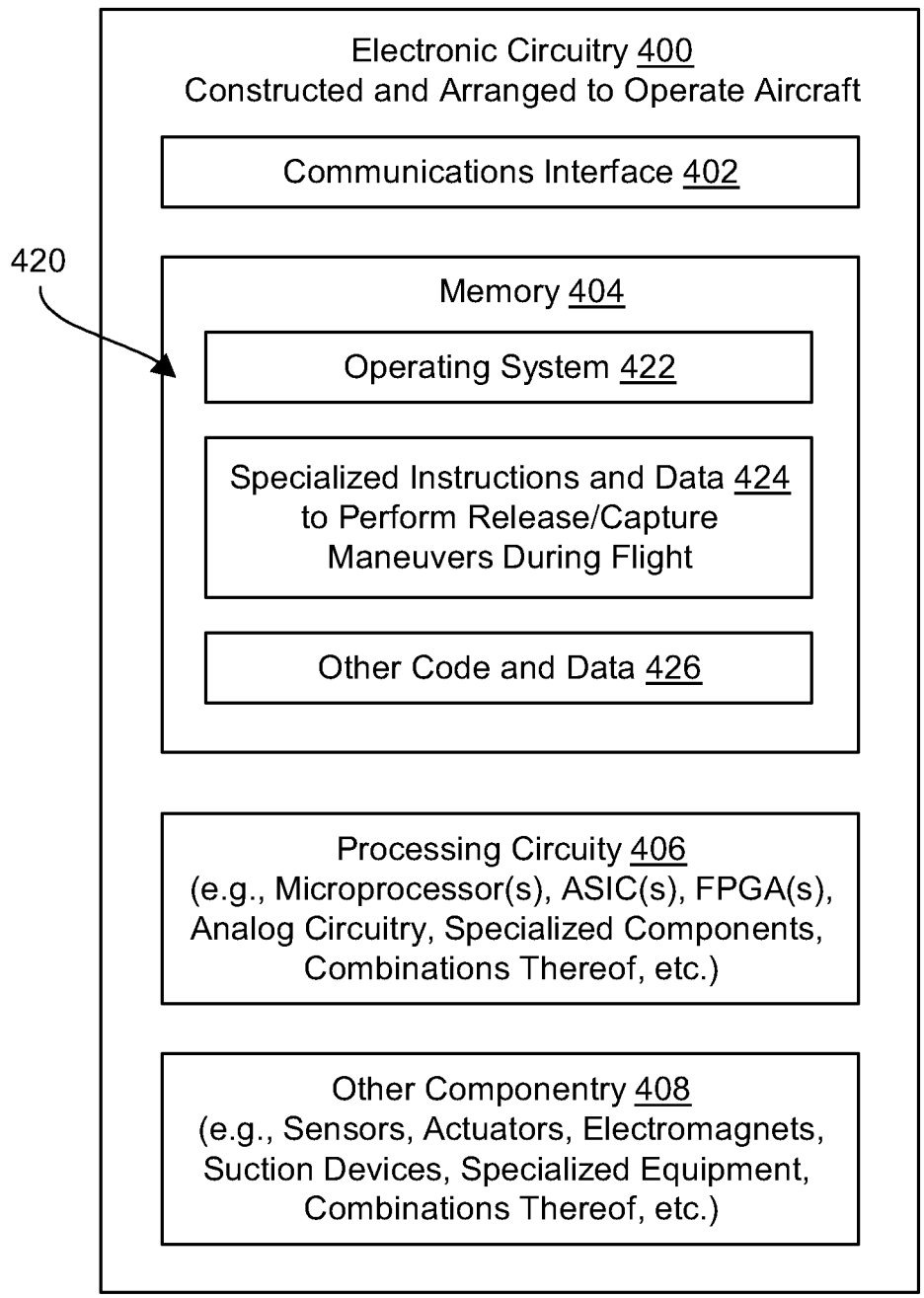

FIG. 12 is a view of certain details of electronic circuitry 400 which is suitable for use by the control circuitry 306 of the fixed-wing aircraft 22 (FIG. 11) and/or the controller 146 of the VTOL aerial vehicle 24 (FIG. 4). The electronic circuitry 400 includes a communications interface 402, memory 404, and processing circuitry 406, and other componentry 408.

The communications interface 402 is constructed and arranged to establish wireless communications with other devices such as other aircraft, a base station, and so on. Such communications may utilize a variety of communications techniques including radio-frequency (RF) communications, encryption, compression, combinations thereof, etc. Accordingly, the communications interface 402 enables the electronic circuitry 400 to robustly and reliably communicate with other external apparatus.

The memory 404 is intended to represent both volatile storage (e.g., DRAM, SRAM, etc.) and non-volatile storage (e.g., flash memory, magnetic memory, etc.). The memory 404 stores a variety of software constructs 420 including an operating system 422, specialized instructions and data 424, and other code and data 426. The operating system 422 refers to particular control code such as a kernel to manage computerized resources (e.g., processor cycles, memory space, etc.), drivers, and so on. The specialized instructions and data 424 refers to code that enables electronic circuitry 400 to perform release and/or capture maneuvers with another aircraft during flight. In some arrangements, the specialized instructions and data 424 is tightly integrated with or part of the operating system 422 itself. The other code and data 426 refers to applications and routines to provide additional operations and services (e.g., to execute a flight plan, to operate various on-board equipment, to perform takeoff and landing operations, etc.), and so on.

The processing circuitry 426 is constructed and arranged to operate in accordance with the various software constructs 420 stored in the memory 424. As will be explained in further detail shortly, the processing circuitry 426 executes at least some of the specialized instructions and data 424 to form specialized circuitry for carrying out the release and/or capture maneuvers.

Such processing circuitry 426 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 440 is capable of delivering all or portions of the software constructs 420 to the electronic circuitry 400. In particular, the computer program product 440 has a non-transitory (or non-volatile) computer readable medium which stores a set of instructions which controls one or more operations of the electronic circuitry 400. Examples of suitable computer readable storage media include tangible articles of manufacture and apparatus which store instructions in a non-volatile manner such as CD-ROM, flash memory, disk memory, tape memory, and the like.

The other componentry 408 refers to other hardware of the electronic circuitry 400. Along these lines, the electronic circuitry 400 may include sensors (e.g., optical sensors, GPS sensors, LIDAR and/or RADAR circuitry, etc.), specialized equipment for holding and/or releasing another aircraft (e.g., actuators, electromagnets, suction devices, etc.), payload equipment, and so on.

During operation, the electronic circuitry 400 provides rich and robust control over the aircraft systems. For example, suppose that one instance of the electronic circuitry 400 forms the control circuitry 306 of the fixed-wing aircraft 22, and another instance of the electronic circuitry 400 forms the controller 146 of the VTOL aerial vehicle 24. With the electronic circuitry 400 in place, the fixed-wing aircraft 22 and the VTOL aerial vehicle 24 may perform a variety of maneuvers such as those of the above-described collaborative release/capture sequence 50 (also see FIG. 3).

For capture and landing, the two aircraft must coordinate their operation. In particular, for capture, the two aircraft must locate each other, perform formation flight, safely close the separation, and engage with each other (e.g., both soft capture and hard capture). For such operation, at least one aircraft senses the other aircrafts position accurately. To this end, there are two layers of sensing and two types of formation flight: farfield and nearfield.

For farfield sensing, the fixed-wing aircraft 22 and the VTOL aerial vehicle 24 may rely on GPS (global positioning system) navigation. That is, each aircraft utilizes onboard GPS circuitry (also see the componentry 408 in FIG. 12) to verify its position (or geolocation) and velocity vectors.

Farfield formation flight (e.g., greater than a few meters) may then be as simple as communicating position and velocity vectors from each aircraft to the other, similar to ADS-B communications for manned aircraft. In accordance with certain embodiments, this information is extracted from onboard GPS receivers typical of automated aircraft, and either communicated directly through a vehicle-to-vehicle link as is the case with ADS-B, or communicated indirectly through a ground station (presuming that the same GCS is communicating with both aircraft and has access to position vector information for both). Such position reporting and closure is effective for roughly maneuvering the two aircraft into a state in which local sensors can take over. However, due to temporal lag and inaccuracy inherent to GPS systems, the aircraft do not rely on farfield sensing nearfield formation flight.

Once the aircraft move within a few meters of each other, the aircraft transition from farfield formation flight to nearfield formation flight where the aircraft perform soft capture and hard capture operations. Nearfield positioning is timelier, more frequent, and more accurate than farfield formation flight.

Nearfield sensing may be accomplished via a variety of arrangements. Such arrangements provide high precision vector feedback and relative position control.

A first nearfield sensing arrangement involves EO/IR sensing, in which a camera or cameras aboard the capturing aircraft are used to identify and track a characteristic of the other aircraft, i.e., the aircraft to be captured). For example, a particularly arranged paint or light pattern enables straightforward relative position and velocity identification of the other aircraft using real-time video processing.

A second nearfield sensing arrangement involves RADAR direct sensing, in which low-power Doppler RADAR is used by the capturing aircraft to locate and track with high resolution the position and relative velocity of the other aircraft.

A third nearfield sensing arrangement involves LIDAR direct sensing, which is nearly identical to RADAR direct sensing, but uses a LIDAR system instead of a RADAR system aboard the capturing aircraft to provide position and velocity information.

It should be understood that the various sensing arrangements may be combined or used with other sensors for confirmation and/or redundancy. Furthermore, regardless of the sensing arrangement, the data product provided by these sensor systems is a position and velocity vector of the aircraft to be captured relative to the capturing aircraft.

That information is used to a) provide high-resolution navigation feedback to the capturing aircraft for the purpose of flight control, and b) permit the implementation of approach gates and limits for the purpose of enabling the soft capture mechanism and setting abort criteria for the rendezvous maneuver. Further details will now be provided with reference to FIGS. 13 and 14.

Figure 13:
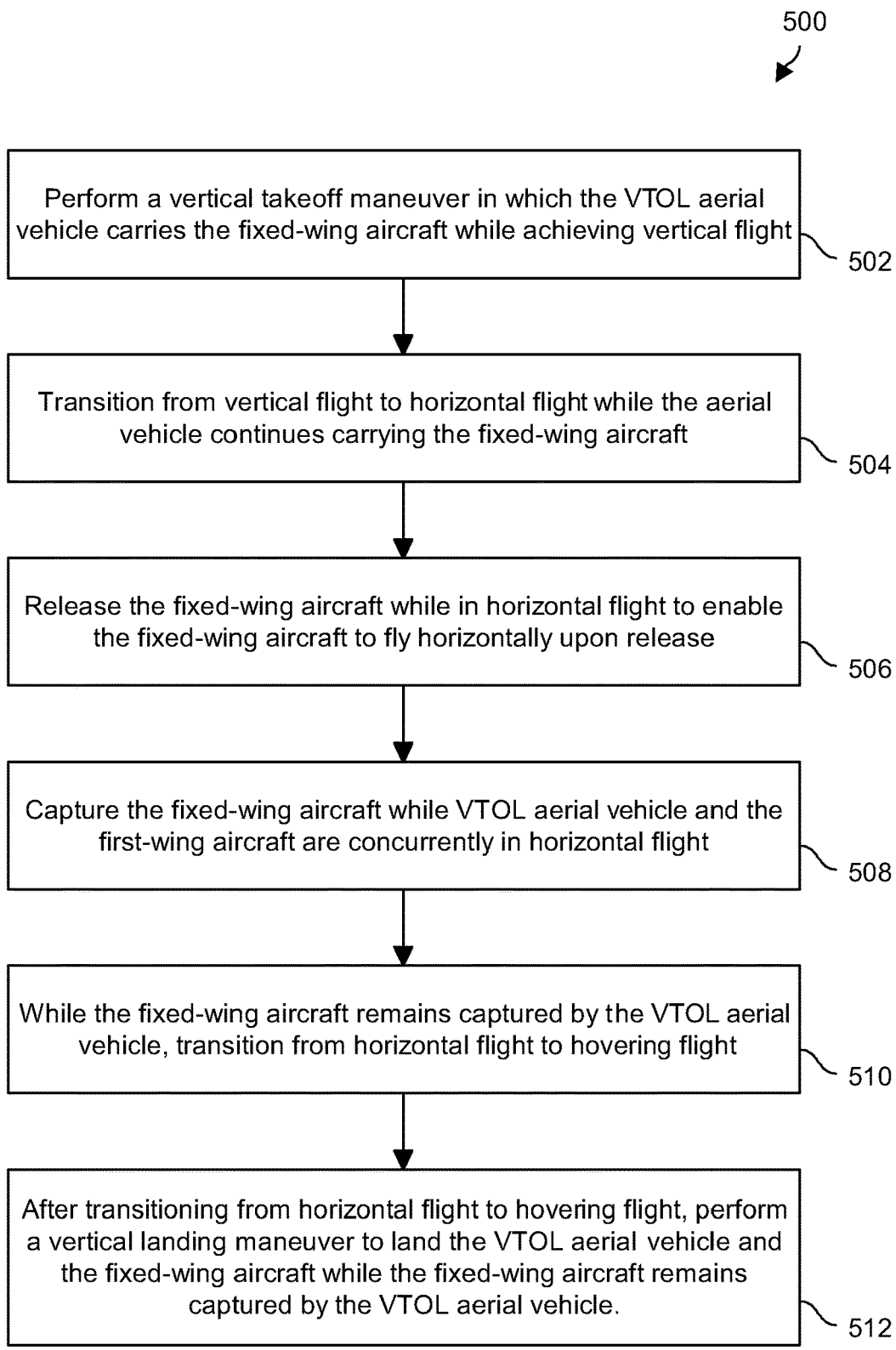
FIG. 13 is flowchart of a procedure which is performed by the VTOL aerial vehicle in accordance with certain embodiments.
Figure 14:
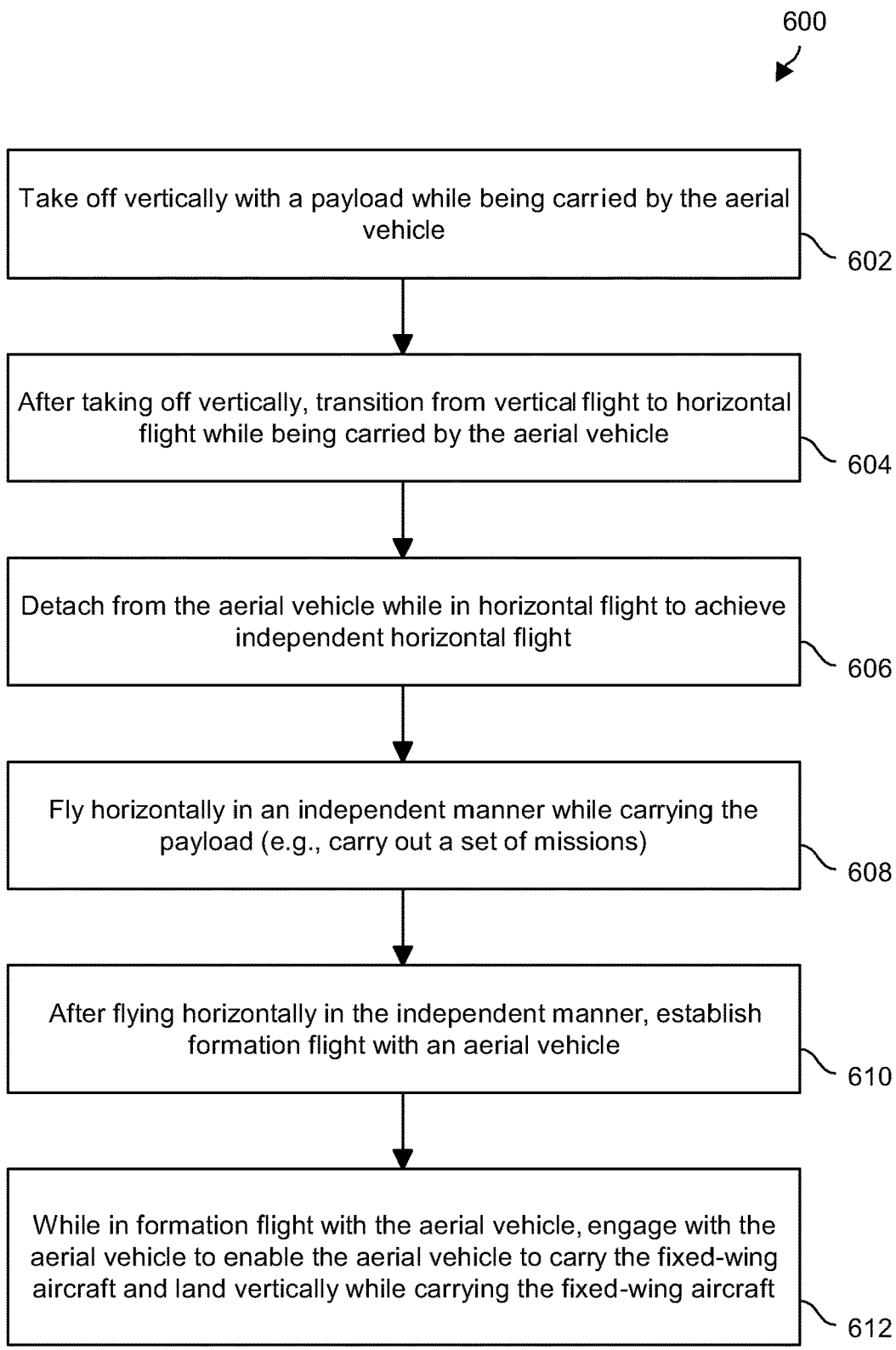
FIG. 14 is flowchart of a procedure which is performed by the fixed-wing aircraft in accordance with certain embodiments.

FIGS. 13 and 14 provide certain operation details for the multivehicle system 20. FIG. 13 is flowchart of a procedure 500 which is performed by the VTOL aerial vehicle 24 in accordance with certain embodiments. FIG. 14 is flowchart of a procedure 600 which is performed by the fixed-wing aircraft 22 in accordance with certain embodiments.

With reference to FIG. 13 and the procedure 500, at 502, the VTOL aerial vehicle 24 performs a vertical takeoff maneuver in which the VTOL aerial vehicle 24 carries the fixed-wing aircraft 22 while achieving vertical flight. Here, the fixed-wing aircraft 22 and the VTOL aerial vehicle 24 start in the attached formation 30. The VTOL aerial vehicle 24 provides vertical lift thus enabling the multivehicle system 20 to takeoff vertically without need of a runway, launcher, etc.

At 504, the VTOL aerial vehicle 24 transitions from vertical flight to horizontal flight while the VTOL aerial vehicle 24 continues carrying the fixed-wing aircraft 22. In some arrangements, the rotors of the VTOL aerial vehicle 24 that provided vertical lift are able to pivot to provide horizontal flight with the fixed-wing aircraft 22 and the VTOL aerial vehicle 24 able to maintain the same orientation as during takeoff. To generate speed in the horizontal direction the propulsion system of the fixed-wing aircraft 22 adds propulsion in the same horizontal direction.

At 506, the VTOL aerial vehicle 24 releases the fixed-wing aircraft while in horizontal flight to enable the fixed-wing aircraft 22 to fly horizontally upon release. In particular, both the fixed-wing aircraft 22 and the VTOL aerial vehicle 24 move fast enough horizontally to sustain independent flight. Accordingly, the fixed-wing aircraft 22 and the VTOL aerial vehicle 24 disengage from each other, i.e., transition from the attached formation 30 to the detached formation 40.

At this point, the fixed-wing aircraft 22 is able to perform a set of missions. For example, the fixed-wing aircraft 22 may execute a flight plan while operating surveillance equipment, carry a cargo, deploy munitions, perform experiments, combinations thereof, etc. Simultaneously, the VTOL aerial vehicle 24 may execute another flight plan such as land vertically to await return of the fixed-wing aircraft 22.

At 508, the VTOL aerial vehicle 24 captures the fixed-wing aircraft 22 while the aerial vehicle 24 and the fixed-wing aircraft 22 are concurrently in horizontal flight. Here, if the VTOL aerial vehicle 24 landed to await return of the fixed-wing aircraft 22, the VTOL aerial vehicle 24 takes off to rendezvous with the fixed-wing aircraft 22. Once the fixed-wing aircraft 22 and the VTOL aerial vehicle 24 are within a particular distance (e.g., several meters), the VTOL aerial vehicle 24 performs a capture operation (e.g., soft capture followed by hard capture) to re-engage with the fixed-wing aircraft 22 while both fly horizontally.

At 510, while the fixed-wing aircraft 22 remains captured by the VTOL aerial vehicle 24, the VTOL aerial vehicle 24 transitions from horizontal flight to hovering flight. Here, if the VTOL aerial vehicle 24 has pitched a subset of rotors to provide a horizontal vector, the VTOL aerial vehicle 24 may pitch all rotors to provide vertical thrust to robustly and reliably hover.

At 512, after transitioning from horizontal flight to hovering flight, the VTOL aerial vehicle 24 performs a vertical landing maneuver to land the VTOL aerial vehicle 24 while the fixed-wing aircraft 22 remains captured by the VTOL aerial vehicle 24. In particular, the multivehicle system 20 is able to land vertically in a tight area without assistance of a landing strip, arresting cable and/or net, etc.

With reference to FIG. 14 and the procedure 600, at 602, the fixed-wing aircraft 22 takes off vertically while being carried by the VTOL aerial vehicle 24. The fixed-wing aircraft 22 may be fully loaded with fuel and a set of payloads to perform a set of missions. Since the fixed-wing aircraft 22 and the VTOL aerial vehicle 24 takeoff vertically while in the attached formation 30, there is no need for a runway or a launcher, etc.

At 604, after taking off vertically, the fixed-wing aircraft 22 transitions from vertical flight to horizontal flight while being carried by the VTOL aerial vehicle 24. Here, the propulsion system of the fixed-wing aircraft 22 contributes to the horizontal vector while the wings of the fixed-wing aircraft 22 provide lift.

At 606, the fixed-wing aircraft 22 detaches from the VTOL aerial vehicle 24 while in horizontal flight thus enabling the fixed-wing aircraft 22 to achieve independent horizontal flight. The fixed-wing aircraft 22 and the VTOL aerial vehicle 24 are now in the detached formation 40. In some arrangements, the fixed-wing aircraft 22 maintains the same orientation (e.g., pitch, etc.) during horizontal flight and release because the VTOL aerial vehicle 24 is provisioned with rotors that are able to pivot.

At 608, the fixed-wing aircraft 22 flies horizontally in an independent manner while carrying the payload. Accordingly, the fixed-wing aircraft 22 is able to execute a flight plan and perform a set of missions. During this time, the VTOL aerial vehicle 24 may hover, land, perform re-fueling/re-charging, takeoff, perform other missions, etc.

At 610, after flying horizontally in the independent manner, the fixed-wing aircraft 22 establishes formation flight with VTOL aerial vehicle 24. The fixed-wing aircraft 22 and the VTOL aerial vehicle 24 may communicate with each other to safely close in on each other while flying horizontally.

At 612, while in formation flight with the VTOL aerial vehicle 24, the fixed-wing aircraft 22 engages with the VTOL aerial vehicle 24 to enable the VTOL aerial vehicle 24 to carry the fixed-wing aircraft 22 and land vertically while carrying the fixed-wing aircraft 22. Here, the fixed-wing aircraft 22 and the VTOL aerial vehicle 24 perform soft capture followed by hard capture. Accordingly, the fixed-wing aircraft 22 and the VTOL aerial vehicle 24 return to the attached formation 30. As explained earlier, the VTOL aerial vehicle 24 may provide the vertical thrust enabling the multivehicle system 20 to land vertically without need of a landing strip, arresting cable and/or net, etc.

As described above, improved techniques are directed to releasing and/or capturing a fixed-wing aircraft 22 using an aerial vehicle 24 with vertical takeoff and landing (VTOL) capabilities while both aircraft 22, 24 are in flight. Along these lines, the VTOL aerial vehicle 24 may take off vertically while carrying the fixed-wing aircraft 22 (e.g., take off as a multivehicle system 20) and then transition to horizontal flight before releasing the fixed-wing aircraft 22. Upon release, the fixed-wing aircraft 22 flies independently to perform a mission (e.g., surveillance, payload delivery, experiments/research, combinations thereof, etc.). After the fixed-wing aircraft 22 has completed its mission and upon return, the VTOL aerial vehicle 24 may capture the fixed-wing aircraft 22 while both are in independent horizontal flight, and then transition to vertical flight in order to land together vertically. Such operation enables the fixed-wing aircraft 22 to vertically take off and/or land while avoiding certain drawbacks associated with a conventional VTOL kit such as being burdened by additional weight and drag from the VTOL kit's rotors/propellers, mounting hardware, etc. during a mission which otherwise would limit the fixed-wing aircraft's maximum airspeed, ceiling, payload capacity, endurance, and so on.

While various embodiments of the present disclosure have been particularly shown and described, it will be understood by those skilled in the art that various changes in form and details may be made therein without departing from the spirit and scope of the present disclosure as defined by the appended claims.

It should be understood that the above-described multi-vehicle system is well-suited for unmanned aerial vehicles (UAVs). Along these lines and in accordance with certain embodiments, a VTOL UAV system can avoid the performance penalties associated with a conventional VTOL kit by separating the system into a VTOL aircraft and a mission aircraft, and involve a method for capturing one vehicle with the other. The resulting system retains the runway independence of a hybrid-quad platform without the mission performance penalty imposed by carrying the VTOL kit for the entire mission. Such a system architecture may scale more readily than the conventional hybrid-quad approach, and can provide a path to VTOL dominance.

It should be further appreciated that certain advances in electric propulsion and battery technologies have given rise to a number of "hybrid quad" UAVs, in which the hovering capabilities of a quadrotor are mated to existing fixed-wing airframes in order to provide a measure of runway independence. This capability is typically delivered in the form of a conventional "VTOL kit". A pair of add-on booms containing batteries, electric motors, controllers, and additional flight control software are mated to the existing airframe, permitting the aircraft to slow to a hover for takeoff and landing.

The difficulty with this conventional approach is that the additional equipment must then be carried by the air vehicle during the entire mission. The weight and drag associated with these devices is such that the resulting air vehicle experiences significant losses in operational capability, i.e. endurance, ceiling, and payload capacity. The aircraft's performance is estimated to be reduced by about a third compared to a non-VTOL but otherwise identical air vehicle. Further, the scaling of hover power with gross vehicle weight make larger vehicles marginally capable or totally impractical.

However, if the VTOL package could be left at the launch/recovery site after takeoff, and reattached prior to landing, the resulting vehicle would truly be the best of both worlds—VTOL capability when needed, and a lightweight, low-drag fixed wing platform when vertical lift is not required. Certain improvements disclosed herein enable such craft, and the technologies that achieve this capability.

The fundamental concept at work here is that the VTOL kit is actually a separate aircraft, capable of flight independent of the fixed-wing aircraft. For launch, the fixed-wing payload is lofted by the VTOL aircraft, accelerated to flight speed, and released into forward flight. Once stabilized and independently airborne, the fixed-wing AV then begins its mission. For recovery, the fixed-wing AV returns to the launch site and enters a known flight pattern. The VTOL aircraft takes off, rendezvousing with the fixed-wing aircraft before deploying a capture mechanism, physically re-mating with the fixed-wing aircraft, and slowing the mated pair back to a hover and subsequent vertical recovery.

In accordance with certain embodiments, the VTOL aircraft is very provisioned in order to achieve VTOL while in a multivehicle configuration with the fixed-wing AV. This excess power capacity can then be used to accelerate to speeds commensurate with a fixed-wing aircraft, allowing the formation flight and rendezvous-capture maneuver required to perform the recovery.

In accordance with certain embodiments, a fixed-wing aircraft of 700 lb gross weight is assumed to be the launched aircraft. An independent VTOL vehicle weighing 400 lb is assumed to be the VTOL aircraft. The techniques disclosed herein are particularly well-suited for such scale.

In accordance with certain embodiments, the capturing aircraft is capable of recovering a variety of different aircraft types. To that end, significant flexibility is designed into the capturing aircraft to permit recovery of the following variations in captured aircraft:

1) High-wing vs. low-wing;
2) Tractor vs. pusher propeller;
3) Propeller vs. jet propulsion;

For each of these possibilities, the location of the capture mechanism and the nature of the thrust vectoring aboard the capturing aircraft provide sufficient configuration flexibility. For example, a captured aircraft with a mid-wing and a pusher propeller may be better suited to be captured from below by a capturing aircraft with tractor propellers; whereas an aircraft with a high wing and a tractor propeller may be better suited to being captured from above by an aircraft with pusher propellers. To that end, the capturing aircraft can be configured with multiple rotors, all of which may be articulated to provide vertical lift or forward thrust, and all of which may be selectively powered down and stowed to improve clearance between the captured aircraft and the rotating propellers on the capturing aircraft. The capturing aircraft itself may also be configured with sensors and capture mechanisms on top and bottom to support either type; or the capturing aircraft may be configured to fly equally well right-side-up and upside-down; or the capturing aircraft may be designed such that the sensor and capture mechanism is modular and can be mounted upward-facing or downward-facing.

When the wing loading, stability, or inertia of the capturing aircraft is substantially different from those of the captured aircraft, artificial control modulation may be employed to make the capturing aircraft's flying qualities similar to those of the captured aircraft. This control methodology is well documented and implemented in several research aircraft since the 1960s. In the context of rendezvous-capture, it has the effect of forcing the captured aircraft to respond to external disturbances matching the response of the captured aircraft. The result of this similarity is an improved position-alignment combination in the presence of atmospheric turbulence, yielding improved chances of successful capture in all weather conditions.

Although UAVs are described above, nothing precludes application of the various techniques disclosed herein to manned vehicles. Such modifications and enhancements are intended to belong to various embodiments of the disclosure.

What is claimed is:

1. An aerial vehicle that provides vertical takeoff and landing (VTOL) capabilities to an aircraft, the aerial vehicle comprising:
   a frame;
   an aircraft interface coupled with the frame, the aircraft interface being constructed and arranged to physically interface with the aircraft which is external to the aerial vehicle;
   a set of rotor assemblies coupled with the frame;
   a set of wing surfaces that provides lift when the set of rotors provides thrust in a horizontal direction; and
   a controller supported by the frame, the controller being constructed and arranged to operate the set of rotor assemblies to provide the VTOL capabilities while the aircraft interface physically interfaces with the aircraft;
   wherein a scissor linkage-style hold/release assembly having a set of engaging mechanisms of the aircraft interface is constructed and arranged to extend from the set of wing surfaces to engage with an underside of the aircraft while the aerial vehicle and the aircraft fly a predefined distance apart from each other during horizontal flight.

2. The aerial vehicle as in claim 1, wherein the aircraft includes a fixed-wing structure constructed and arranged to provide lift to the aircraft during horizontal flight; and
   wherein the set of wing surfaces of the aerial vehicle in tandem with the fixed-wing structure of the aircraft are constructed and arranged to provide lift while the aircraft resides above the aerial vehicle and the aerial vehicle resides below the aircraft during horizontal flight.

3. The aerial vehicle as in claim 1 wherein the frame is constructed and arranged to carry, as the aircraft, a fixed-wing unmanned aerial vehicle (UAV) having a wing-span of at least 20 feet and an initial weight of at least 400 pounds during a vertical takeoff maneuver.

4. The aerial vehicle as in claim 3 wherein the set of rotor assemblies is constructed and arranged to fly the aerial vehicle at a horizontal speed of at least 50 miles per hour while the aerial vehicle carries the fixed-wing UAV during a release-in-flight maneuver.

5. The aerial vehicle as in claim 4 wherein the set of rotor assemblies includes at least four rotor assemblies, each rotor assembly being constructed and arranged to provide at least 100 pounds of lift to during the vertical takeoff maneuver.

6. The aerial vehicle as in claim 1 wherein the hold/release assembly is mounted to the frame, the set of engaging mechanisms of the hold/release assembly being responsive to a set of hold/release signals from the controller to selectively hold the aircraft to the frame and release the aircraft from the frame while the aerial vehicle is in flight.

7. The aerial vehicle as in claim 6 wherein the set of engaging mechanisms of the hold/release assembly includes:
   a set of electromagnets coupled with the frame, the set of electromagnets being constructed and arranged to control attraction of the aircraft to the frame in response to the set of hold/release signals from the controller.

8. The aerial vehicle as in claim 6 wherein the set of engaging mechanisms of the hold/release assembly includes:
   a set of suction devices coupled with the frame, the set of suction devices being constructed and arranged to control drawing of the aircraft to the frame in response to the set of hold/release signals from the controller.

9. The aerial vehicle as in claim 6 wherein the set of engaging mechanisms of the hold/release assembly includes:
   a set of latching mechanisms coupled with the frame, the set of latching mechanisms being constructed and arranged to control fastening of the aircraft to the frame in response to the set of hold/release signals from the controller.

10. The aerial vehicle as in claim 1, further comprising:
    a sensing assembly which is supported by the frame, the sensing assembly being constructed and arranged to provide a set of position signals to the controller to identify a position of the aircraft relative to the aerial vehicle while the aircraft and the aerial vehicle are in flight.

11. The aerial vehicle as in claim 10 wherein the sensing assembly includes:
    a farfield sensing subsystem constructed and arranged to provide a set of farfield sensing signals to the controller, the set of farfield sensing signals including location data that enables the controller to establish formation flight between the aircraft and the aerial vehicle in response to the set of farfield sensing signals.

12. The aerial vehicle as in claim 11 wherein the sensing assembly further includes:
    a nearfield sensing subsystem constructed and arranged to provide a set of nearfield sensing signals to the controller, the set of nearfield sensing signals including relative position and velocity data that enables the controller to establish soft capture proximity between the aircraft and the aerial vehicle in response to the set of nearfield sensing signals.

13. The aerial vehicle as in claim 12 wherein the nearfield sensing subsystem includes:
    a light detection and ranging (LIDAR) subsystem constructed and arranged to provide a set of LIDAR subsystem signals to the controller to identify current position and velocity of the aircraft relative to the aerial vehicle while the aircraft and the aerial vehicle are in flight.

14. The aerial vehicle as in claim 12 wherein the nearfield sensing subsystem includes:
    a radio detection and ranging (RADAR) subsystem constructed and arranged to provide a set of RADAR subsystem signals to the controller to identify current position and velocity of the aircraft relative to the aerial vehicle while the aircraft and the aerial vehicle are in flight.

15. The aerial vehicle as in claim 12 wherein the nearfield sensing subsystem includes:
    a set of optical sensors constructed and arranged to provide a set of image signals to the controller to identify current position of the aircraft relative to the aerial vehicle while the aircraft and the aerial vehicle are in flight.

16. A method of operating an aerial vehicle, comprising:

capturing a fixed-wing aircraft while the aerial vehicle and the fixed-wing aircraft are concurrently in horizontal flight, the aerial vehicle including a set of rotors and a set of wing surfaces that provides lift when the set of rotors provides thrust in a horizontal direction;

while the fixed-wing aircraft remains captured by the aerial vehicle, transitioning from horizontal flight to hovering flight; and after transitioning from horizontal flight to hovering flight, performing a vertical landing maneuver to land the aerial vehicle while the fixed-wing aircraft remains captured by the aerial vehicle;

wherein capturing the fixed-wing aircraft includes extending a scissor linkage-style hold/release assembly having a set of engaging mechanisms of the aerial vehicle from the set of wing surfaces of the aerial vehicle to engage with an underside of the fixed-wing aircraft while the aerial vehicle and the fixed-wing aircraft fly a predefined distance apart from each other during horizontal flight.

17. The method as in claim 16, further comprising:

performing a vertical takeoff maneuver in which the aerial vehicle carries the fixed-wing aircraft while achieving vertical flight;

transitioning from vertical flight to horizontal flight while the aerial vehicle continues carrying the fixed-wing aircraft; and releasing the fixed-wing aircraft while in horizontal flight to enable the fixed-wing aircraft to fly horizontally upon release.

18. A fixed-wing aircraft, comprising:

a fixed-wing structure constructed and arranged to carry a payload;

an aircraft propulsion system coupled with the fixed-wing structure; and an engagement section coupled with the fixed-wing structure, the engagement section being constructed and arranged to engage with an aerial vehicle while the fixed-wing aircraft is propelled by the aircraft propulsion system during flight, the aerial vehicle including a set of rotors and a set of wing surfaces that, in combination with the fixed-wing structure, provides lift when the set of rotors provides thrust in a horizontal direction;

wherein the engagement section is disposed on an underside of the fixed-wing aircraft to engage a scissor linkage-style hold/release assembly having a set of engaging mechanisms of the aerial vehicle when the scissor linkage-style hold/release assembly extends from the set of wing surfaces to engage with the underside of the aircraft while the aerial vehicle and the aircraft fly a predefined distance apart from each other during horizontal flight.

19. A method of operating a fixed-wing aircraft, comprising:

flying horizontally in an independent manner while carrying a payload;

after flying horizontally in the independent manner, establishing formation flight with an aerial vehicle, the aerial vehicle including a set of rotors and a set of wing surfaces that, in combination with a fixed-wing structure of the fixed-wing aircraft, provides lift when the set of rotors provides thrust in a horizontal direction; and while in formation flight with the aerial vehicle, engaging with the aerial vehicle to enable the aerial vehicle to carry the fixed-wing aircraft and land vertically while carrying the fixed-wing aircraft;

wherein engaging with the aerial vehicle includes an underside of the fixed-wing aircraft engaging a scissor linkage-style hold/release assembly having a set of engaging mechanisms of the aerial vehicle when the scissor linkage-style hold/release assembly extends from the set of wing surfaces to engage with the underside of the aircraft while the aerial vehicle and the aircraft fly a predefined distance apart from each other during horizontal flight.

20. The method as in claim 19, further comprising:

prior to flying horizontally in the independent manner, taking off vertically while being carried by the aerial vehicle;

after taking off vertically, transitioning from vertical flight to horizontal flight while being carried by the aerial vehicle; and detaching from the aerial vehicle while in horizontal flight to achieve independent horizontal flight.

21. A multivehicle system, comprising:

a fixed-wing aircraft and an aerial vehicle which is separate from the fixed-wing aircraft;

the fixed-wing aircraft including:
 a fixed-wing structure constructed and arranged to carry a payload,
 an aircraft propulsion system coupled with the fixed-wing structure, and
 an engagement section coupled with the fixed-wing structure, the engagement section being constructed and arranged to engage with the aerial vehicle while the fixed-wing aircraft is propelled by the aircraft propulsion system during flight;

the aerial vehicle including:
 a frame,
 an aircraft interface coupled with the frame, the aircraft interface being constructed and arranged to physically interface with the fixed-wing aircraft,
 a set of rotor assemblies coupled with the frame,
 a set of wing surfaces that provides lift when the set of rotors provides thrust in a horizontal direction, and
 a controller supported by the frame, the controller being constructed and arranged to operate the set of rotor assemblies to provide the VTOL capabilities while the aircraft interface physically interfaces with the fixed-wing aircraft;

wherein a scissor linkage-style hold/release assembly having a set of engaging mechanisms of the aircraft interface is constructed and arranged to extend from the set of wing surfaces to engage with an underside of the fixed-wing aircraft while the aerial vehicle and the fixed-wing aircraft fly a predefined distance apart from each other during horizontal flight.

* * * * *